(12) United States Patent
Chakrabarti et al.

(10) Patent No.: US 7,584,159 B1
(45) Date of Patent: Sep. 1, 2009

(54) STRATEGIES FOR PROVIDING NOVEL RECOMMENDATIONS

(75) Inventors: Kushal Chakrabarti, Seattle, WA (US); Ron Kohavi, Issaquah, WA (US); Brent R. Smith, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 603 days.

(21) Appl. No.: 11/263,563

(22) Filed: Oct. 31, 2005

(51) Int. Cl.
*G06F 17/00* (2006.01)
*G06N 5/00* (2006.01)

(52) U.S. Cl. .................................... 706/45
(58) Field of Classification Search .............. 706/45
See application file for complete search history.

(56) References Cited

U.S. PATENT DOCUMENTS

| | | | |
|---|---|---|---|
| 5,544,080 A * | 8/1996 | Kobayashi et al. | 700/280 |
| 5,734,720 A * | 3/1998 | Salganicoff | 380/211 |
| 5,758,257 A * | 5/1998 | Herz et al. | 725/116 |
| 5,960,411 A | 9/1999 | Hartman et al. | |
| 6,006,225 A | 12/1999 | Bowman et al. | |
| 6,020,883 A * | 2/2000 | Herz et al. | 715/721 |
| 6,029,141 A | 2/2000 | Bezos et al. | |
| 6,064,980 A | 5/2000 | Jacobi et al. | |
| 6,088,722 A * | 7/2000 | Herz et al. | 709/217 |
| 6,097,817 A | 8/2000 | Bilgic et al. | |
| 6,169,986 B1 | 1/2001 | Bowman et al. | |
| 6,185,558 B1 | 2/2001 | Bowman et al. | |
| 6,208,627 B1 | 3/2001 | Menon et al. | |
| 6,266,649 B1 | 7/2001 | Linden et al. | |
| 6,317,722 B1 | 11/2001 | Jacobi et al. | |
| 6,321,221 B1 | 11/2001 | Bieganski | |
| 6,363,420 B1 | 3/2002 | Coward | |
| 6,366,910 B1 | 4/2002 | Rajaraman et al. | |
| 6,438,579 B1 | 8/2002 | Hosken | |
| 6,466,918 B1 | 10/2002 | Spiegel et al. | |
| 6,489,968 B1 | 12/2002 | Ortega et al. | |
| 6,526,026 B1 | 2/2003 | Menon | |
| 6,571,243 B2 | 5/2003 | Gupta et al. | |
| 6,580,906 B2 | 6/2003 | Bilgic et al. | |
| 6,606,619 B2 | 8/2003 | Ortega et al. | |
| 6,625,609 B1 | 9/2003 | McDade et al. | |
| 6,711,586 B1 | 3/2004 | Wells | |
| 6,751,205 B2 | 6/2004 | Menon et al. | |
| 6,772,150 B1 | 8/2004 | Whitman et al. | |

(Continued)

OTHER PUBLICATIONS

U.S. Appl. No. 11/263,068, filed Oct. 31, 2005, Chakrabarti, et al., "Strategies for Providing Diverse Recommendations."

(Continued)

*Primary Examiner*—Michael B Holmes
(74) *Attorney, Agent, or Firm*—Lee & Hayes, PLLC

(57) ABSTRACT

Strategies are described for generating recommendations. The strategies generate a set of original recommendations based on a source of information. The strategies then transform the set of original recommendations into a set of similarity-spaced recommendations based on "repulsion force" analysis applied to the set of original recommendations. In a first implementation, the set of spaced recommendations represent a diverse sampling of items in the set of original recommendations. In a second implementation, the set of spaced recommendations represent a sampling of items in the set of original recommendations which omits or excludes recommendations assessed as obvious. A third implementation can combine the first and second implementations.

29 Claims, 12 Drawing Sheets

U.S. PATENT DOCUMENTS

| | | | |
|---|---|---|---|
| 6,785,671 | B1 | 8/2004 | Bailey et al. |
| 6,853,982 | B2 | 2/2005 | Smith et al. |
| 6,865,546 | B1 | 3/2005 | Song |
| 6,912,533 | B1 | 6/2005 | Hornick |
| 7,065,528 | B2* | 6/2006 | Herz et al. ............... 707/10 |
| 7,079,500 | B2 | 7/2006 | Menon |
| 7,092,841 | B2* | 8/2006 | Gilsdorf et al. ........... 702/150 |
| 7,194,466 | B2* | 3/2007 | Chen et al. .................. 707/6 |
| 7,289,985 | B2* | 10/2007 | Zeng et al. .................. 707/3 |
| 7,305,389 | B2* | 12/2007 | Zeng et al. .................. 707/5 |
| 7,322,041 | B2 | 1/2008 | Bilgic et al. |
| 7,359,364 | B2 | 4/2008 | Yuhan et al. |
| 7,366,951 | B2* | 4/2008 | Fallah et al. ................ 714/33 |
| 7,447,681 | B2* | 11/2008 | Lightstone et al. ........... 707/3 |
| 7,529,765 | B2* | 5/2009 | Brants et al. ............... 707/102 |
| 7,542,951 | B1* | 6/2009 | Chakrabarti et al. .......... 706/45 |
| 2001/0014868 | A1 | 8/2001 | Herz et al. |

OTHER PUBLICATIONS

Chakrabarti, et al., Non-Final Office Action for U.S. Appl. No. 11/263,068. Mailed on Sep. 26, 2008, 14 pages.

Zhai et al., "Beyond Independent Relevance: Methods and Evaluation Metrics for Subtopic Retrieval," SIGIR-2003, Toronto Canada, 2003, published by ACM, 8 pages.

Shneiderman, "Dynamic Queries for Visual Information Seeking," University of Maryland, College Park, MD, revised 1994, 18 pages.

Mori et al., "Information Gain Ratio Meets Maximal Marginal Relevance," Proceedings of the Third NTCIR Workshop, 2003 National Institute of Informatics, 16 pages.

Zaïane, "Principles of Knowledge Discovery in Databases," available at <<http://www.cs.ualberta.ca/~zaiane/courses/cmput690/slides/Chapter8/>>, accessed on Jan. 28, 2006, 45 pages.

Hinneburg et al., "Clustering Techniques for Large Data Sets," available at <<http://users.informatik.uni-halle.de/~hinnebur/ClusterTutorial/>>, accessed on Jan. 28, 2006, 65 pages.

Similarity Explorer sample screen shot, provided by Amazon.com, 1 page. date unknown.

U.S. Appl. No. 11/263,068, filed on Oct. 31, 2005, Kushal Chakrabarti et al., "Strategies for Providing Diverse Recommendations."

U.S. Appl. No. 10/684,313, filed Oct 13, 2003, Mason, "Predictive Analysis of Browse Activity Data of Users of a Database Access system in Which Items are Arranged in a Hierarchy."

U.S. Appl. No. 11/041,522, filed Jan. 21, 2005, Holden et al., "Method and System for Automated Comparison of Items."

U.S. Appl. No. 10/996,343, filed on Oct. 15, 2004, Vadon, "Identifying Items Relevant to a Keyword."

U.S. Appl. No. 10/966,827, filed on Oct. 15, 2004, Vadon, "Identifying Items Relevant to a Keyword."

U.S. Appl. No. 10/817554, filed on filed Oct. 15, 2004, "Automated Detection of Associations Between Search Criteria and Item Categories Based on Collective Analysis of User Activity Data."

U.S. Appl. No. 10/864,288, filed Jun. 9, 2004, "Mining of User Activity Data to Extract Conditional Probability Data Reflective of User Selections From an Electronic Catalog."

U.S. Appl. No. 10/262,587, filed Sep. 30, 2002, "Information Retrieval Systems and Methods that Use User-Defined Lists to Identify Related Offerings."

Lindenmeier, et al., "Vehicle-conformal SDARS diversity antenna system by a fast operating diversity algorithm", Antennas and Propogation Society International Symposium, 2005, IEEE vol. 1B, Jul. 2005, pp. 76-79.

* cited by examiner

Recommended for John Smith

802  1.  [Pic]  War and Peace
         See related items  by Leo Tolstoy
         Publication Date: September 28, 1984
         Our Price: $23.10
         Why was I recommended this?
         Rate this item  X | ✩ ✩ ✩ ✩
         ☐ I own it        ☐ Not interested
         ( Add to Cart )
         ( Add to Wish List )

804  2.  [Pic]  Epilepsy and Art
         See related items  by Dr. Jane Doe, MD
         Publication Date: January 31, 1993
         Our Price: $10.98
         Why was I recommended this?
         Rate this item  X | ✩ ✩ ✩ ✩
         ☐ I own it        ☐ Not interested
         ( Add to Cart )
         ( Add to Wish List )

806  3.  [Pic]  The Nose
         See related items  by Nikolay Gogol
         Publication Date: December 3, 1976
         Our Price: $30.10
         Why was I recommended this?
         Rate this item  X | ✩ ✩ ✩ ✩
         ☐ I own it        ☐ Not interested
         ( Add to Cart )
         ( Add to Wish List )

808  4.  [Pic]  Visit St. Petersburg on a Shoestring Budget!
         See related items  by Mary Jones
         Publication Date: June 15, 2004
         Our Price: $7.25
         Why was I recommended this?
         Rate this item  X | ✩ ✩ ✩ ✩
         ☐ I own it        ☐ Not interested
         ( Add to Cart )
         ( Add to Wish List )

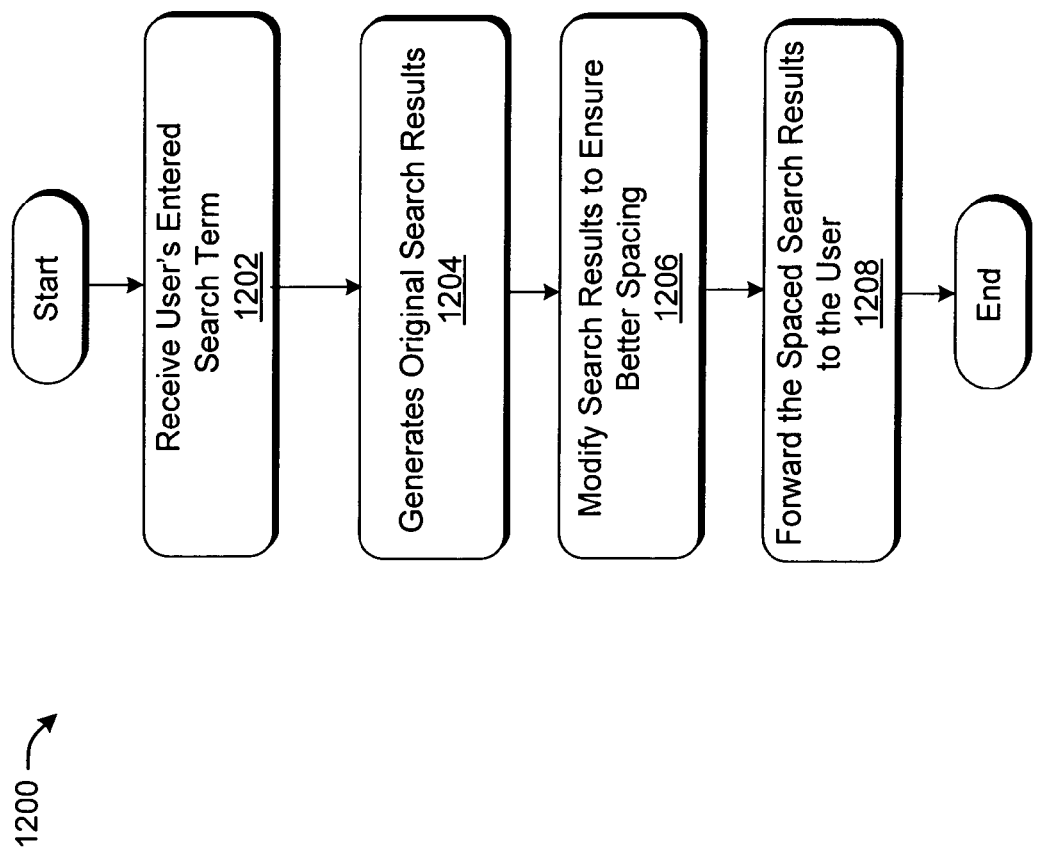

STRATEGIES FOR PROVIDING NOVEL RECOMMENDATIONS

CROSS-REFERENCE TO RELATED APPLICATIONS

The present application is related to co-pending U.S. patent application Ser. No. 11/263,068, entitled "STRATEGIES FOR PROVIDING DIVERSE RECOMMENDATIONS," filed on the same date as the instant application. This related application is incorporated by reference herein in their entirety.

TECHNICAL FIELD

This subject matter generally relates to strategies for providing recommendations to users. In a more particular exemplary implementation, this subject matter relates to strategies for providing recommendations to users in an online environment, the recommendations inviting the users to purchase items or take other actions.

BACKGROUND

Numerous techniques for merchandising items have been developed for application in an online environment. In one technique, a Web merchandiser sends recommendations to users via the Internet. The recommendations typically prompt the users to purchase items identified by the recommendations, such as products (e.g., books, music, clothing, jewelry, etc.) and/or services.

To increase the effectiveness of the recommendations, and hence sales revenue, the Web merchandiser may attempt to provide recommendations which match the interests of the users. To ascertain the interests of the users, the Web merchandiser may examine the online behavior of the users. For example, the Web merchandiser may examine the online purchases of the users and/or other online activity of the users. A user who purchases an item (or performs some other action with respect to the item) is presumed to have an interest in this kind of item.

In generating recommendations, the web merchandiser can then use a recommendation engine to determine items which are related to the assessed interests of the users. The recommendation engine can assess "relatedness" in different ways. In one technique, the recommendation engine can rely on empirical data derived from user profiles to gauge similarity. For example, the recommendation engine can assess that item X is similar to item Y if a statistically significant number of users who purchased item X also purchased item Y. More generally, recommendation engines are often based on the implicit assumption that a recommendation's value is directly proportional to its relatedness to the assessed interests of a user. Thus, the objective of these recommendation engines is to generate a set of n recommendations which most closely match the assessed interests of the user.

Such an approach has proven successful, but it is not without its drawbacks. For example, consider the scenario shown in FIG. 1. In this case, a user, John Smith, has purchased one or more books by the author Dostoevsky. Based on this pattern of behavior, the recommendation engine logically determines that this user is interested in books by Dostoevsky. In response, the recommendation engine may determine that the most relevant recommendations correspond to additional books written by Dostoevsky (that the user has not yet purchased). This scenario reflects the situation in FIG. 1, where the recommendation engine generates recommendations 102, 104, 106, 108, etc., which all pertain to books written by the author Dostoevsky.

FIG. 2 illustrates the operation of the recommendation engine in high-level conceptual form. In this figure, the source information 202 serves as the basis from which recommendation are generated. This source information 202, for instance, may reflect the user's prior purchase of several books by Dostoevsky. The items $R_1$-$R_{16}$ which figuratively "orbit" the source information 202 correspond to recommendations generated by the recommendation engine based on information provided by the source information 202. The "distance" of each recommendation from the source information 202 represents the assessed relatedness between that recommendation and the source information 202. For instance, recommendation $R_2$ is more related to the source information 202 than recommendation $R_{12}$, because the distance $d_1$ between the recommendation $R_2$ and the source information 202 is shorter than the distance $d_2$ between the recommendation $R_{12}$ and the source information 202. As explained above, the goal of many recommendation engines is to select a set of n recommendations within a certain threshold distance form the source information 202, defined by a core similarity space 204. Recommendations 102-108 shown in FIG. 1 correspond to recommendations $R_1$-$R_4$ within the core similarity space 204.

The recommendations 102-108 shown in FIG. 1 no doubt match one of John Smith's literary interests. However, the recommendations 102-108 may not convey sufficiently interesting information to this user. This is because a user who has purchased several books by Dostoevsky likely knows something about Dostoevsky, including at least the identity of the most popular works written by this author. Thus, alerting the user to the existence of other works by Dostoevsky likely does not impart any novel information to the user. And even if the user is actually interested in books by Dostoevsky, the homogeneous nature of these recommendations may quickly lose the interest of the user.

Therefore, known recommendation-generating algorithms may, in some circumstances, prove unsatisfactory for at least two reasons. First, inundating a user with many recommendations pertaining to an obvious or "univocal" theme might displease the user, as this approach essentially clutters the user's user interface presentation with useless or monotonous information. Second, providing obvious and/or highly homogeneous recommendations, to the user may fail to prompt the user to purchase the recommended items, thus potentially reducing the revenue of the Web merchandiser.

For at least the above-identified reasons, there is an exemplary need for more satisfactory strategies for providing recommendations.

SUMMARY

Strategies are described herein for generating recommendations. The strategies generate a set of original recommendations based on a source of information. The strategies then transform the set of original recommendations into a set of spaced recommendations based on "repulsion force" analysis applied to the set of original recommendations. Generally, the repulsion force analysis ensures that at least one original recommendation is separated (or "pushed away") from a reference by at least a prescribed amount (as defined by any kind of relatedness metric), the prescribed amount being sufficient to provide a desired degree of variation in recommendations. In a first implementation, the set of spaced recommendations represents a widely dispersed sampling of items in the set of original recommendations, as opposed to a "univocal" cluster of recommendations centered on just one assessed interest of a user. In this context, the reference against which a recommendation is pushed away from pertains to at least one other recommendation. In a second implementation, the set of spaced recommendations represents a sampling of items in the set of original recommendations which specifically excludes or dilutes recommendations that are assessed as obvious to a user. Removal of obvious recommendations may potentially have the effect of omitting or diluting a core group of recommendations which most closely match the interests of the user. In this context, the reference against which a recommendation is pushed away from pertains to "known information" that reflects the presumed known interests of the user (e.g., based on the user's past purchases, etc.). A third implementation combines the first and second implementations, such that the spaced recommendations are both mutually spread apart from each other and separated from the presumed known interests of the user.

Among other exemplary benefits, these strategies reduce the potential that the recommendations will cluster around a single, potentially obvious, topic (or only a small number of topics). Consequently, the recommendation-generating strategies described herein provide recommendations that are more likely to impart interesting information to the user. This potentially improves the online experience of the user, and also potentially increases the likelihood that the user will purchase or otherwise select items based on the recommendations. For example, in the case of diversity analysis, the strategies better ensure that the user receives recommendations for a wide variety of items, increasing the chances that the user will find an item that the user is willing to purchase or otherwise select. In the case of novelty analysis, the strategies better ensure that the user receives recommendations which reduce the amount of items that the user is unlikely to purchase or otherwise select, because, for instance, the user is familiar wit the items (and would have already purchased the items if this was the user's intention).

In one case, the spaced recommendations may achieve desired separation between recommendations (or desired separation between the recommendations and the known interests of a user) by, in part, excluding recommendations from the original set of recommendations. In another case, the spaced recommendations may achieve desired separation by, in part, adding new recommendations to the original set of recommendations. In another case, the spaced recommendations may achieve desired separation by, in part, reordering the recommendations in the original set of recommendations. Still other cases can combine the characteristics of any of the above-identified scenarios in any manner.

Any type of clustering analysis (or any other kind of analysis) can be used to form the spaced recommendations, including algorithms which rely on the use of an explicit distance metric, and algorithms which do not.

Additional exemplary implementations are described in the following.

BRIEF DESCRIPTION OF THE DRAWINGS

FIG. 8 shows an exemplary user interface presentation containing a list of recommendations with improved spacing, produced by the system of FIG. 5.

FIGS. 9-12 illustrate exemplary procedures for generating spaced recommendations using the system of FIG. 5, or some other system.

Figure 1:
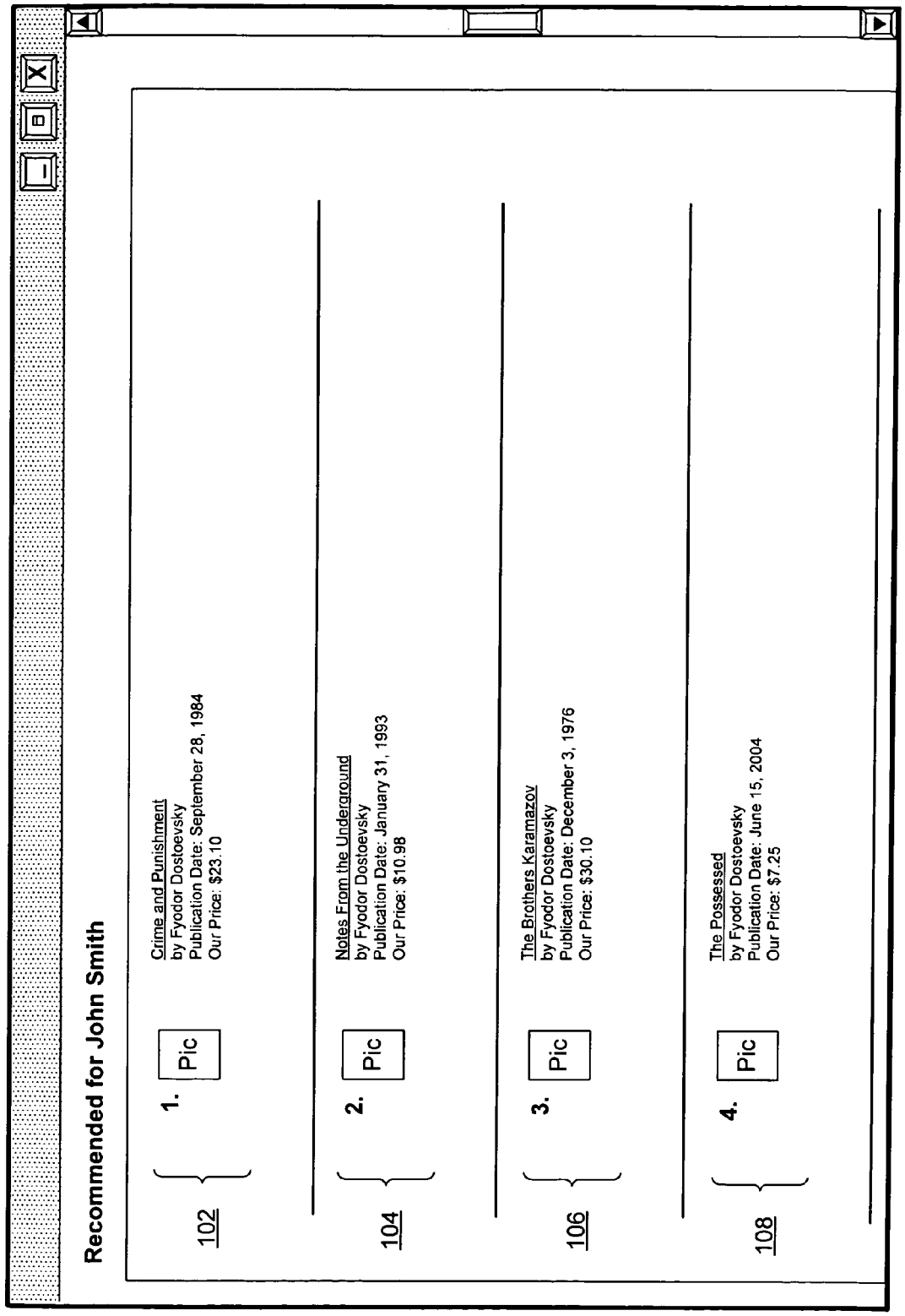
FIG. 1 shows an exemplary user interface presentation containing a list of recommendations which exhibit poor spacing.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a recommendation-generating module and related techniques for generating a set of spaced recommendations, where "spaced" refers to separation in similarity space, e.g., as gauged by any kind of relatedness metric. The techniques generate the set of spaced recommendations based on "repulsion force" analysis. Two algorithms are described for achieving spacing. A first algorithm applies the concept of repulsion force to help space the recommendations apart; this algorithm is referred to as a "mutual separation algorithm" or a "diversity algorithm," since the spaced recommendations are mutually spread apart from each other and thereby rendered diverse. A second algorithm applies a concept of repulsion force to space the recommendations apart from known information (comprising information that is presumed to be known to a user); this second algorithm is referred to as a "novelty algorithm," since the spaced recommendations exhibit non-obviousness (by excluding or otherwise reducing the concentration of items that are considered obvious to the user).

As a preliminary matter, the term "recommendation" has broad connotation. It refers to any information conveyed to a user that identifies any item. In the examples most commonly evoked in this discussion, the items pertain to products and/or services that may be purchased, rented, leased, licensed, traded, subscribed to, furnished as a gift, etc., or otherwise selected by the user. In this context, the recommendations serve as invitations that prompt the users to purchase or otherwise select the items.

However, the term "recommendation" can also identify other kinds of items, including purely informational items, financial items, legal items, and so forth. For example, a user may enter a search query, prompting a search engine to generate search results. In this context, the search results constitute "recommendations" as this term is very broadly used herein. The items associated with these recommendations might correspond to URL hits, journal citations, and so forth.

The term "spacing" likewise has broad connotation. It refers to separation or variance between two entities in similarity space, as measured by any kind of relatedness metric. In one case, a set of recommendations is deemed "spaced" if it represents a mutually dispersed sampling of items in a set of recommendations—in other words, a diverse sampling of recommendations. In another case, a set of recommendations is deemed "spaced" if it excludes (or at least dilutes the representation of) obvious items in a set of recommendations. In other words, this scenario is considered spaced because the recommendations are at least dispersed with respect to a defined collection of known information.

The term "relatedness" or "similarity" broadly refers to any kind of meaningful association among items, such as between two recommendations, between a recommendation and source information, and so forth. Relatedness can be determined in various ways using various metrics; hence, use of this term herein does not refer to any one technique for determining the association between items.

The terms "logic, "module" or "functionality" as used herein generally represents hardware, software or a combination of hardware and software, or any other kind of implementation. For instance, in the case of a software implementation, the term "logic," "module," or "functionality" represents program code that performs specified tasks when executed on a processing device or devices (e.g., CPU or CPUs). The program code can be stored in one or more computer readable memory devices.

This disclosure includes the following sections. Section A presents an overview of two exemplary spacing algorithms that provide a set of spaced recommendations. Second B presents exemplary systems for implementing the spacing algorithms described in Section A. Section C describes the operation of the systems of Section A in flowchart form. And Section D describes other exemplary implementations of repulsion force analysis, including various types of clustering analyses.

A. Overview of Spacing Algorithms (FIGS. 3 and 4)

Figure 3:
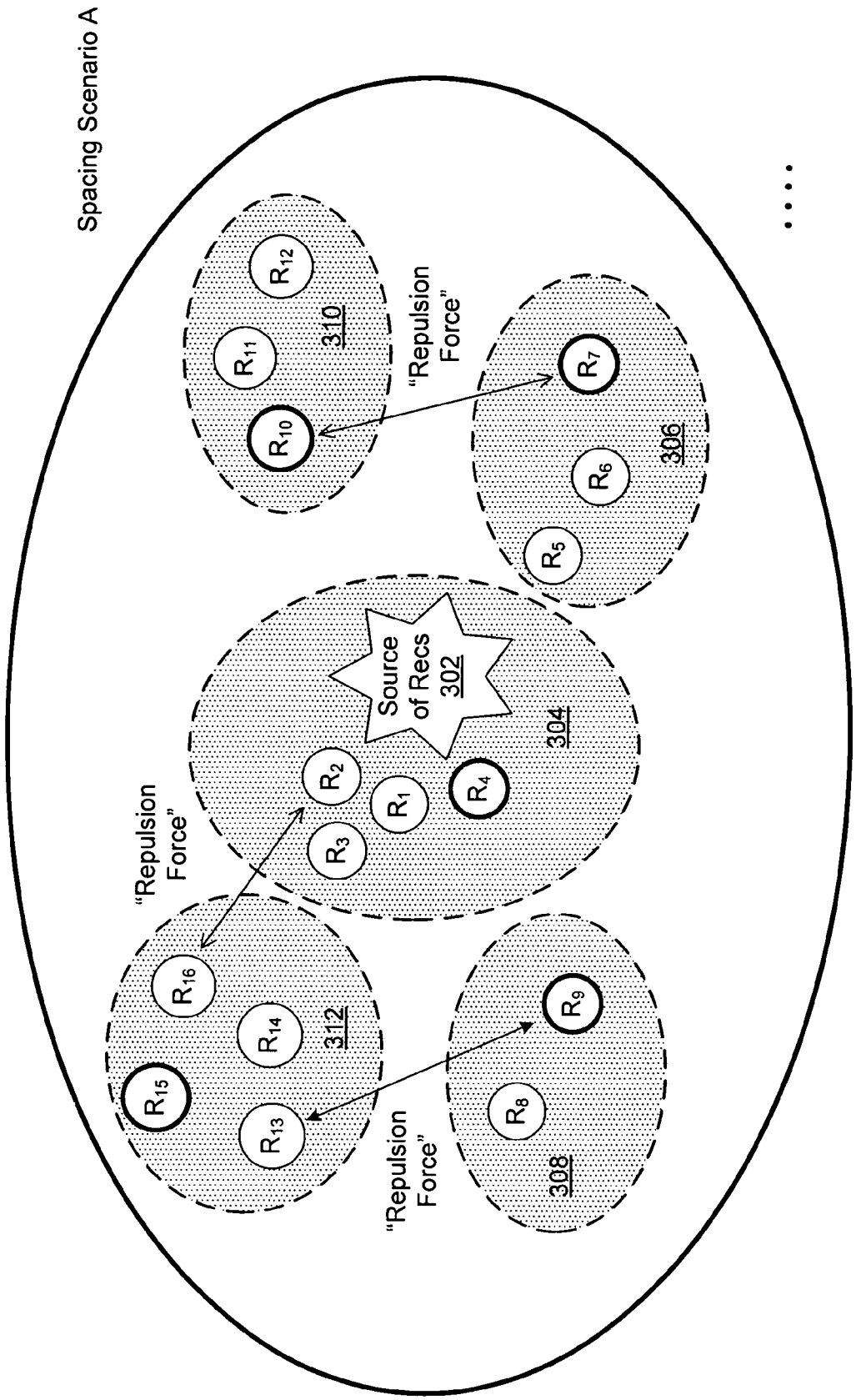
FIG. 3 shows a high-level conceptualization of a first exemplary algorithm according to the present invention for generating recommendations that exhibit improved spacing.
Figure 4:
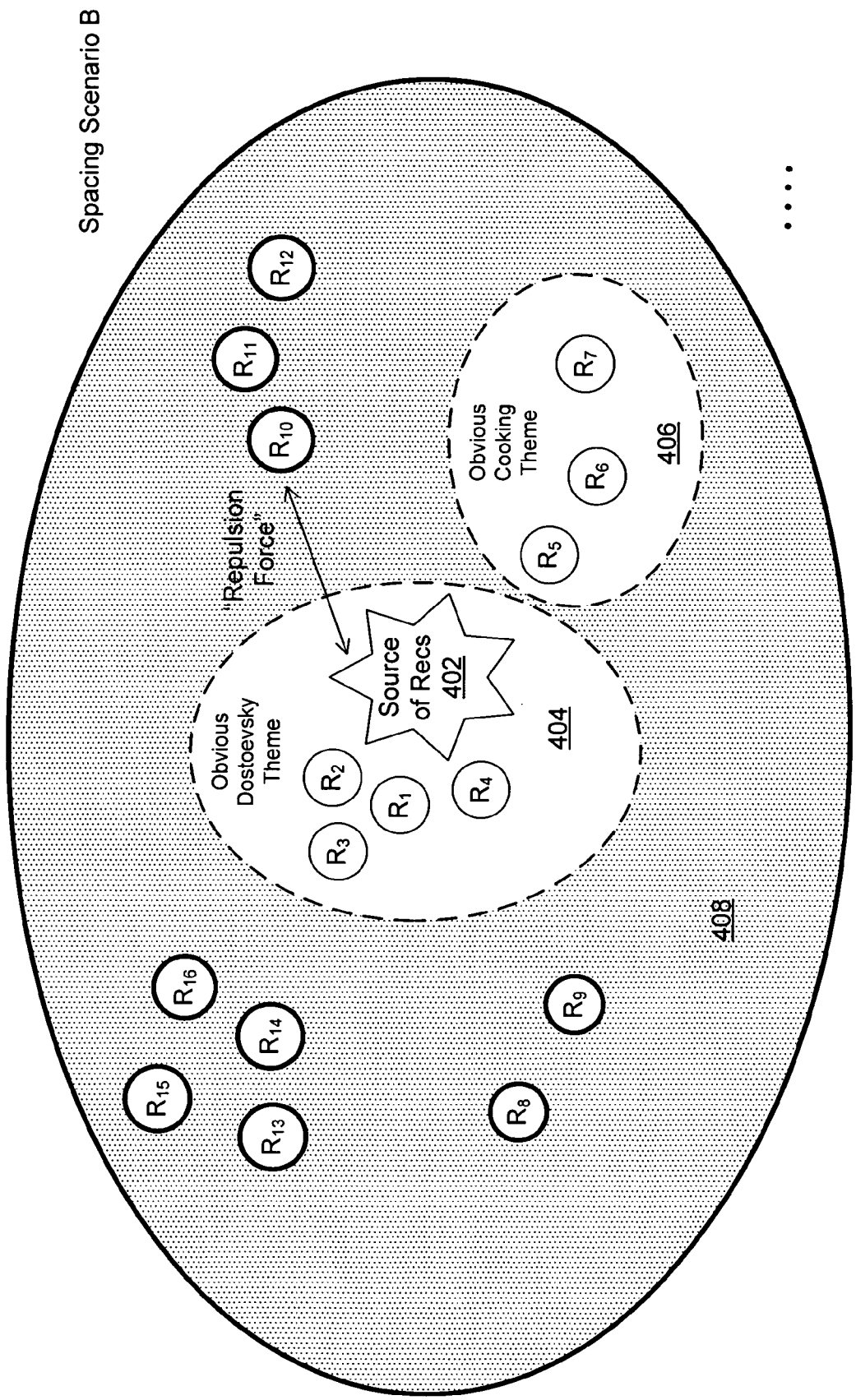
FIG. 4 shows a high-level conceptualization of a second exemplary algorithm according to the present invention for generating recommendations that exhibit improved spacing.

By way of introduction, FIGS. 3 and 4 are diagrams which provide high-level conceptualizations of two spacing algorithms. The spacing algorithms generate a set of recommendations having spaced results. Namely, FIG. 3 shows the principle of operation of a first spacing algorithm ("algorithm A"), which performs clustering-type analysis to provide the set of spaced recommendations; it does this by using the concept of "repulsion force" in the above-described manner to ensure that the recommendations are mutually spaced apart from each other by a desired minimum amount, to thereby provide diverse recommendations. FIG. 4 shows the principle of operation of a second spacing algorithm ("algorithm B"), which performs novelty-type analysis to provide the set of spaced recommendations; it does this by using the concept of repulsion force to ensure that the spaced recommendations are separated from information that the user is presumed to already know about (comprising "known information"). This section imparts general exemplary features of these algorithms, while Section C (below) provides more detailed information regarding one exemplary manner that these algorithms can be implemented.

At the outset, to facilitate, explanation, the algorithms are described in terms of the generation of an "original" set of recommendations and then the application of spacing processing on this set of original recommendations to produce the set of spaced recommendations. In one implementation, these operations can indeed be performed as two temporal series of events; namely, the original recommendations are generated first, and then the original recommendations are fed as input into the spacing algorithm to generate the spaced recommendations. But in other implementations, the generation of "original" recommendations can be intertwined with the spacing of these recommendations such that these operations are not performed in simple temporal succession, but are part of a single process for generating spaced recommendations based on source information.

Further, in those circumstances in which the original recommendations are indeed generated first followed by the generation of spaced recommendations, in one implementation, a single entity (e.g., a singe Web site) can perform both of these tasks. But in another implementation, a first entity can generate the original recommendations and a second entity can then ensure that these recommendations are satisfactorily spaced. This scenario can correspond to the case in which a first commercial entity takes the recommendations generated by another commercial entity and modifies these recommendations using one or more spacing algorithms for output to its own users.

A.1. Spacing Algorithm A (Mutual Separation, e.g., Diversity)

Beginning with FIG. 3, preliminary discussion follows regarding exemplary algorithms that can be used to generate the set of so-called "original recommendations" (e.g., in the context of FIG. 3, the algorithms that can be used to generate the original recommendations $R_1$-$R_{16}$). The algorithms which generate the original recommendations are referred to as "first pass" or "original" algorithms below to distinguish these algorithms from the post-processing performed by the spacing algorithms.

To begin with, source information 302, figuratively illustrated in FIG. 3, can include different types of information, including user-related information. For example, the user-related source information 302 can comprise any combination of the following non-exhaustive types of information:

The source information can comprise a list of items purchased by users.

In another scenario, the source information 302 can comprise a list of items rated by the users. That is, a Web application might allow the users to rank the desirability of items, and this ranking information can be gleaned for use in the source information 302.

In another scenario, the source information 302 can comprise can comprise items that the users place in shopping carts (with or without actually later purchasing these items), or place in so-called "wish lists."

In another scenario, the source information 302 can comprise items that the users simply investigate, e.g., by clicking on these items to receive more information regarding these items, or by simply moving a graphical cursor over these items via a mouse or other kind of input device, and so forth.

In another scenario, the source information 302 can comprise preference-related information entered by the users. For example, the users may expressly provide inputs that indicate that they desire that a particular criterion be used as a basis to generate recommendations. Or the users may expressly provide inputs that indicate that they do not want particular criterion to be used as a basis for generating recommendation. Still other user-related information can be captured for use in the source information 302.

In another scenario, the source information 302 can comprise items that have been previously recommended to the user.

Still other kinds of information can be used to populate the collection of source information 302, reflecting the behavior the users, the characteristics of the users (such as demographic information pertaining to the users), and so forth. As will be discussed below, the user-related source information 302 can also be interpreted as information that the user is presumed to know about (e.g., comprising "known information"). As will be discussed, the novelty-based spacing algorithm can generate spaced recommendations by "repelling" against this known information.

In any event, the source information 302 provides a knowledge based which can be mined to generate the set of original recommendations $R_1$-$R_{16}$. Of course, the number (i.e., 16) of recommendations shown in FIG. 3 is merely illustrative; the first-pass recommendation algorithm can generate any number of recommendations.

Different first pass recommendation algorithms can be used to generate the set of original recommendations $R_1$-$R_{16}$ based on the source information 302. These algorithms generate recommendations which do not necessarily exhibit satisfactory spacing; it is then the task of the spacing algorithms, described below, to modify the output of these first pass algorithms to generate a set of spaced recommendations.

One exemplary and non-limiting first pass algorithm that can be used to provide recommendations is described in U.S. Pat. Nos. 6,266,649 and 6,853,982. Both of these patents are incorporated herein by reference in their respective entireties. By way of overview, the technique described in these patents offline-compiles a similarity table which identifies the similarity among items. Similarity is gauged mainly by empirical data. That is, for example, the similarity table identifies that an item X is similar to an item Y if a statistically relevant number of users who purchased (or otherwise expressed an interest in) item X also purchased (or otherwise expressed an interest in) item Y. One exemplary and non-limiting commonality index (CI) between item X and item Y can be generated using the equation:

$$CI(\text{Asset}_X, \text{Asset}_Y) = \frac{N_{common}}{\sqrt{N_X \times N_Y}},\quad\text{(Equation 1)}$$

where $N_{common}$ represents the number of users who purchase both items X and Y, $N_X$ represents the number of users who purchased item X, and $N_Y$ represents the number of users who purchased item Y.

The algorithm then uses the similarity table to generate recommendations by mapping items known to be of interest to a particular user into related items. That is, the interests of the user can be determined from the source information 302, and this interest information can then be used as a lookup key to determine, using the similarity table, those items which are related to the assessed interests of the user. This process generates a series of unfiltered recommendations. The algorithm can then subject these unfiltered recommendations to various filters to remove certain recommendations. For example, if the user has previously purchased a hardcover version of a book, it is inappropriate to generate a recommendation for a soft cover version of the same book. A filter can be employed to remove these kinds of superfluous recommendations. The recommendations can also be passed through one or more other filters which weight the recommendations based on various weighting considerations. The result of the application of recommendation algorithm is the set of so-called original recommendations $R_1$-$R_{16}$ shown in FIG. 3.

Another first pass algorithm for generating the original recommendations can determine the relatedness of items based on an analysis of the classification of items within a browse tree. For example, the items can be organized as nodes within a hierarchical browse tree (or graph). The traversal distance between one node and another node in the tree is representative of the relatedness between these items. For example, a browse tree may organize books into different genres on a first level, and then different authors within each genre on a lower child level. Books within the same genre branch of the tree are more related than books in different genres. Books by the same author are even more similar. Thus, in this algorithm, a classification-related metric of distance can be used to determine recommendations that are "close to" the assessed interests of the users (as gauged from the source information 302).

Another first pass recommendation algorithm determines the relatedness of items based on an analysis of the attributes of the items (such as authors, publishers, publication dates, and so forth). In this algorithm, an attribute-related metric of distance can be used to determine recommendations that are "close to" the assessed interests of the users.

Another first pass recommendation algorithm determines the relatedness of items based on an analysis of the textual/syntactical properties of items. For example, Hamming distance algorithms can be used to find similarities in alphanumeric information used to describe respective items. In this algorithm, a semantic-related metric of distance can be used to determine recommendations that are "close to" the assessed interests of the users.

Other first pass recommendation algorithms can apply various probabilistic analyses to assess relatedness, such as Bayesian-type analysis. In this algorithm, a probability-related metric of distance can be used to determine recommendations that are "close to" the assessed interests of the users.

Still other kinds of first pass algorithms (or combinations of first pass algorithms) can be used to generate the set of original recommendations $R_1$-$R_{16}$. Whatever algorithm is used, recommendations that are close to the source information 302 are deemed more closely related to the user's interests than recommendations that are relatively far away from the source information 302. Moreover, pairwise combinations of recommendations that are illustrated as spatially close together should be interpreted as closely related, while pairwise combinations of recommendations that are illustrated as spatially far apart should be interpreted as more remotely related. However, because many different algorithms can be used to generate the set of original recommendations, and because many different metrics can be used to assess relatedness, the spatial arrangement of the recommendations $R_1$-$R_{16}$ in FIG. 3 should be interpreted merely figuratively to indicate that the recommendations $R_1$-$R_{16}$ have some variable degree of relatedness to the assessed interests of the user and to each other. In other words, the two-dimensional distribution of recommendations shown in FIG. 3 does not otherwise necessarily have significance in this high-level conceptualization.

Now turning to the spacing processing, the spacing algorithm (algorithm A) shown in FIG. 3 accepts the set of original recommendations $R_1$-$R_{16}$ (generated by a first pass algorithm) as input and generates a set of spaced recommendations. In this specific case of the spacing algorithm A, a "spaced" set of recommendations constitutes a set of recommendations which represent many different kinds of items encompassed by the original recommendations $R_1$-$R_{16}$, rather than narrowly focusing on just the recommendations deemed most closely related to the source information 302. In other words, the original recommendations are modified so as to diversify these recommendations. Modifying the set of original recommendations in this manner is desirable because merely selecting the most relevant items can potentially (although not necessarily) provide a biased set of recommendations, because these highly relevant samples may also be highly related to each other, and hence may represent the same theme. This problem was set forth with respect to the exemplary list of recommendations shown in FIG. 1. Here, the user purchased one or more books by a certain author, Dostoevsky, which prompted the first pass algorithm to generate a set of recommendations $R_1$-$R_4$ that are highly biased to a Dostoevsky-centric theme. Namely, these recommendations simply identify other books written by Dostoevsky.

Recommendation $R_5$ is also highly related to the user's interests but may pertain to another topic based on another assessed interest of the user. For example, the user may also be interested in cooking, and has purchased one book on cooking; as such, recommendation $R_5$ may represent a recommended cooking book, but this recommendation is nevertheless effectively "drowned out" by the user's stronger interest in Dostoevsky.

Generally stated, the spacing algorithm A shown in FIG. 3 achieves spacing by partitioning the recommendations $R_1$-$R_{16}$ into different clusters (304, 306, 308, 310, 312) that represents similar groups of items within the set of original recommendations $R_1$-$R_{16}$. The spacing algorithm A then selects representative members from each of the clusters—in this case, the exemplary bolded recommendations $R_4$, $R_7$, $R_9$, $R_{10}$ and $R_{15}$. These representative recommendations constitute a spaced set of recommendations which are output to the user, instead of the set of original recommendations $R_1$-$R_{16}$ or merely the subset of recommendations that are deemed most closely related to the source information 302 (e.g., the recommendations $R_1$-$R_5$ in cluster 204 of FIG. 2). The number of clusters shown in FIG. 3, as well as the number of representative samples selected from each cluster, is merely exemplary; the spacing algorithm A can generate any number of clusters and can select any number of samples from each cluster depending on definable configuration settings. Environment-specific optimization modeling and/or empirical investigation can be used to select the optimal values for these parameters.

One way of conceptualizing the operation of the algorithm shown in FIG. 3 is that there is an attraction force between the source information 302 and the original recommendations $R_1$-$R_{16}$ which accounts for the inclusion of these recommendations $R_1$-$R_{16}$ in the first pass original recommendation results. However, by virtue of the application of the spacing algorithm A, there is also a repulsive force between individual recommendations. This means that, by analogy to opposing magnets, recommendations that are close together in a tight cluster repel each other strongly. The effect of spacing algorithm A is to reduce strongly repellent recommendations (representing subsets of strongly related recommendations) by diluting highly repellent clusters in recommendation space. This can be also be viewed as minimizing the "configuration energy" of the final set of recommendations, meaning that the final recommendations are as mutually far aart from each other as possible, or at least approximately so.

Different criteria can be used to measure the relatedness (e.g., distance) between any two recommendations. In one implementation, any of the distance metrics described above (which were used to generate the set of original recommendations R1-R16 vis-à-vis the source information 302) can also be used to assess the relatedness between any two recommendations. For example, a distance between recommendations may be computed based on an empirically derived correlation index (discussed above), the separation between nodes in a hierarchical browse tree, the textual/syntactical difference between alphanumeric item information, some combination of these metrics, and so forth. Further, various approximates can be used in certain circumstances to expedite processing. For instance, in one case, diversity can be improved by limiting the number of recommendations generated using the same rationale, limiting the number of recommendations associated with a node or a collection of nodes within a browse hierarchy, and/or limiting the number of recommendations that have similar titles or other descriptive features (e.g, as gauged using a hamming distance metric, etc.).

Figure 10:
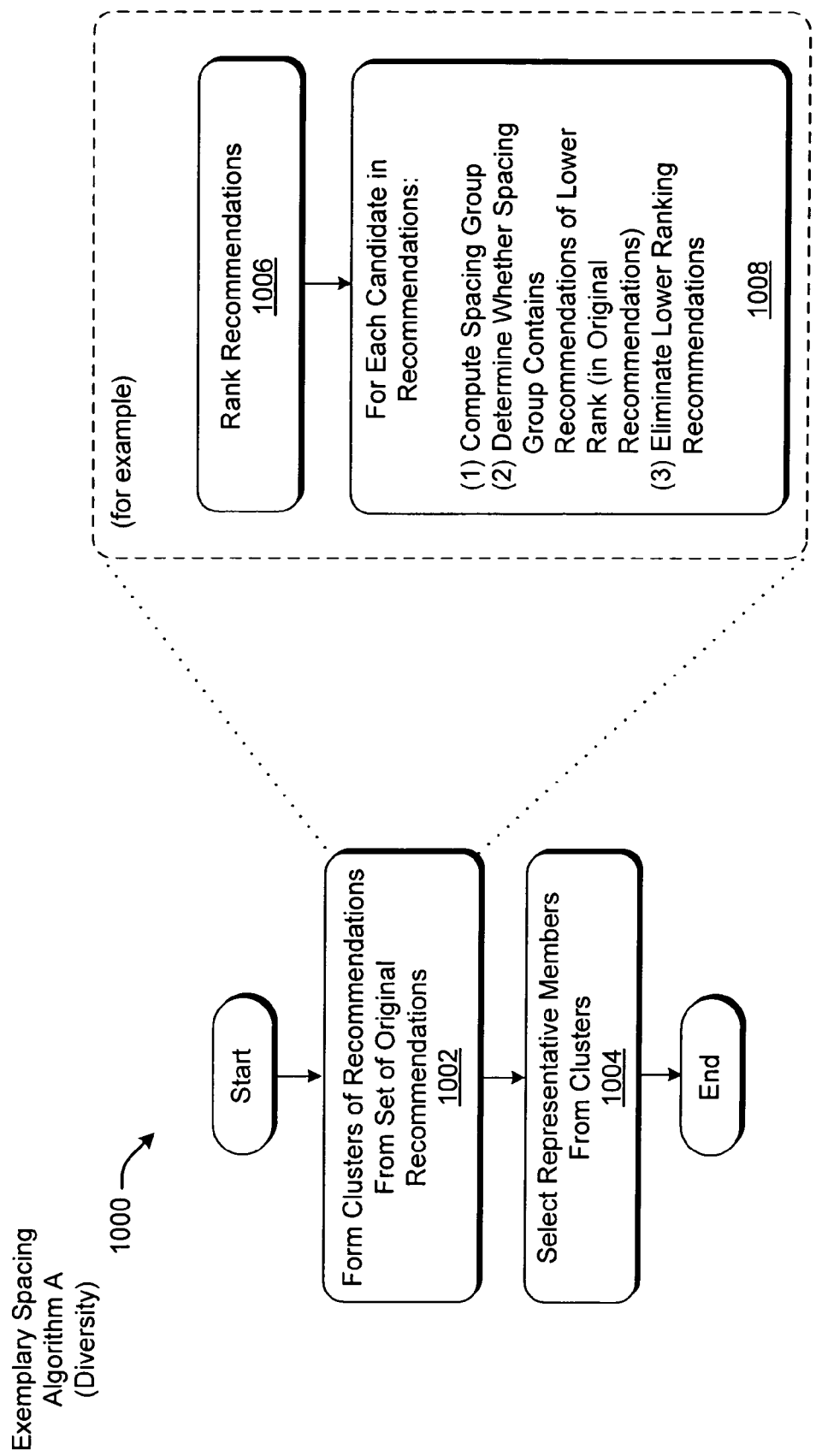

Likewise, different techniques can be used to perform cluster analysis on the set of original recommendations $R_1$-$R_{16}$. FIG. 10, to be discussed below in turn, illustrates one such exemplary technique.

A.2. Spacing Algorithm B (Novelty)

FIG 4 shows a second spacing algorithm ("spacing algorithm B") for providing a spaced set of recommendations based on the set of original recommendations $R_1$-$R_{16}$. The same kinds of first pass algorithms discussed above (in the context of spacing algorithm A) can be used to generate the set of original recommendations $R_1$-$R_{16}$. Hence, discussion will advance directly to exemplary salient features of spacing algorithm B itself.

Like spacing algorithm A, spacing algorithm B culls a subset of recommendations from the set of original recommendations R1-R16 to improve the spacing of the recommendations that are output to the user. In the case of FIG 4, the operative concept underlying the spacing algorithm is still repulsive force, but in this case, the algorithm ensures that the spaced recommendations repel against known information, rather than each other (unless, of course, algorithm A is combined with algorithm B). The "known information" may identify items that the user is presumed to already know about. Any of the user-related source information 302 enumerated above can also be interpreted as known information. But in this stage of the processing, the recommendations are chosen to be sufficiently far away from the known information, not sufficiently close to the known information. Different criteria can be used to measure the separation of recommendations from known information, such as any of the exemplary criteria identified in the previous section.

Application of spacing algorithm B has the effect of better ensuring novelty in the recommendations. Namely, spacing algorithm B acts to eliminate from the set of original recommendations $R_1$-$R_{16}$ those recommendations that are deemed "obvious," or to otherwise dilute the presence of such obvious recommendations. A recommendation is considered obvious when it identifies an item which the user already knows about, or is at least presumed to already know about. This approach thereby provides a final set of recommendations for output to the user which is potentially more complexly related to the user's assessed interests, and, for this reason, potentially more thought-provoking to the user (and also potentially more enticing). The term "novelty" is used to describe the characteristics of the recommendations generated by spacing algorithm B, although other appropriate terms might be "non-obviousness," "freshness," and so forth.

FIG. 4 conceptually illustrates the operation of spacing algorithm B. As shown there, a first pass algorithm generates recommendation $R_1$-$R_{16}$ based on source information 402 (which is equivalent to the above-described source information 302 discussed in the context of FIG. 3). Spacing algorithm B processes these results by excluding recommendations $R_1$-$R_7$ that are assessed to be closely related to items that the user already knows about or is presumed to already know about. In this entirely exemplary scenario, these recommendations originate from two clusters, cluster 404 and cluster 406. In the example developed above, cluster 404 may have an obvious Dostoevsky-centric theme which the user is presumed to already know about, while cluster 406 may have a cooking-related theme which the user is also presumed to know about. By excluding these items $R_1$-$R_7$, algorithm B outputs the potentially more novel recommendations $R_8$-$R_{16}$ which appear in non-obvious recommendation space 408.

Figure 11:
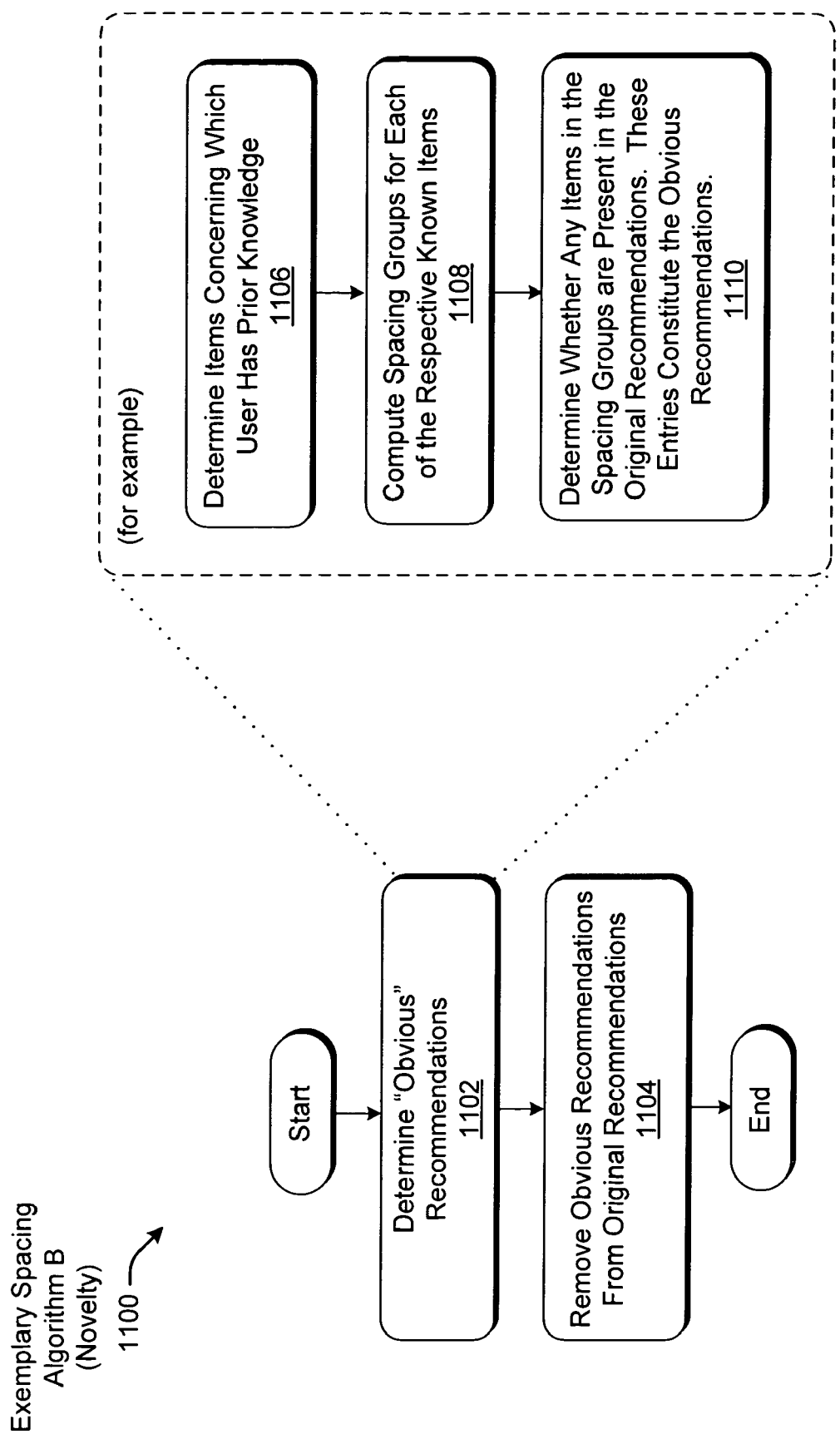

Different techniques can be used to determine so-called obvious recommendations. FIG. 11, to be discussed below in turn, illustrates one exemplary technique. By way of preview, the technique described there identifies items that the user knows about or is presumed to know about (e.g., based on the above-described known information), and then expands these known items into a larger set of items which are related to the known items. The technique then determines whether any of the members of the larger set of items are present in the original recommendations $R_1$-$R_{16}$, and if so, it removes these matching recommendations.

To conclude this section, the two spacing algorithms (A and B) described above are exemplary. Other spacing algorithms can be deployed to improve the spacing in output recommendations forwarded to the user. Further, different spacing algorithms can be combined together, such as spacing algorithms A and B set forth above, to thereby achieve both a reduction in "clumping" in the recommendations and the reduction in the number of obvious recommendations.

According to another general features, in one case, the spaced recommendations can comprise a subset that is selected from the original recommendations, and, as such, the subset of spaced recommendations contains no new recommendations. In another case, the spaced recommendations can include new recommendations.

In still another case, the set of spaced recommendations represents a reordering of recommendations in the original recommendations. This ensures that the recommendations are not clumped together, but it achieves this objective by modifying the order in which the original recommendations are presented, rather than outright excluding the recommendations. This better ensures that the user will not see a large number of similar recommendations in succession. This approach can also be combined with any of the above-described algorithms, such that the spaced set of recommendations is produced by both modifying the membership of the original set of recommendations and by reordering the recommendations in the original set of recommendations.

B. Exemplary Systems (FIGS. 5-8)

FIGS. 5-8 show exemplary systems for implementing the spacing algorithms described in the proceeding section. In one implementation, the systems shown in FIGS. 5-8 can be used to interact with a plurality of users in an online environment. electronically receiving input from the users via a network infrastructure and electronically providing recommendations to the users via the network infrastructure. However, the spacing algorithms can be implemented in other ways. For example, source information used to generate the recommendations can be collected in any manner (including a manual manner), and the resultant recommendations generated based on the source information can be communicated back to the users in any manner (including a manual manner, such as by hardcopy mail, etc.). Other implementations can apply the spacing algorithms at a site of purchase, such as by generating one or more coupons (that constitute recommendations) when the users purchase one or more items at a store. Accordingly, the description which follows represents only one possible implementation of the spacing algorithms.

B.1. Overview of an Exemplary System

Figure 5:
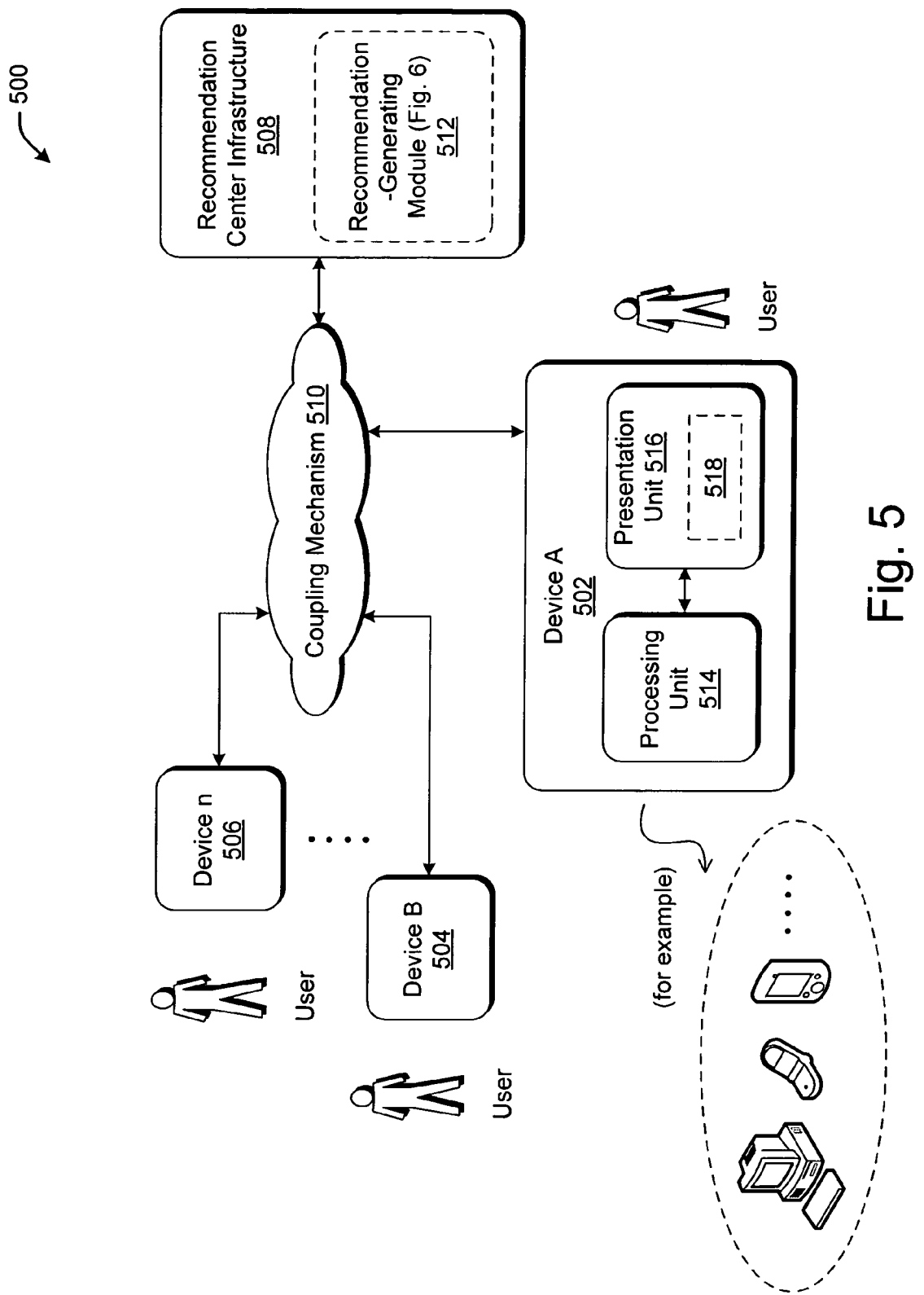
FIG. 5 shows an exemplary system for generating spaced recommendations using the spacing algorithms shown in FIG. 3, FIG. 4, or some other approach.

FIG. 5 shows an overview of one particular online system 500 for implementing the spacing algorithms described above. In this system 500, a plurality of devices (502, 504, . . . 506) are coupled to recommendation center infrastructure 508 by a coupling mechanism 510. A plurality of users use the respective devices (502, 504, . . . 506) to interact with the recommendation center infrastructure 508.

The recommendation center infrastructure 508 can generally represent equipment maintained by a Web merchandiser or other entity. In one case, the Web merchandiser may offer the users an online catalogue of items to browse through, and can generate recommendations to users based on various criteria (described above). The component of the recommendation center infrastructure 508 that generates the recommendations is referred to as the recommendation-generating module 512. This module 512 is described more fully in the context of FIG. 6 in the next subsection. (It should be noted that, to facilitate discussion, the following discussion is based on the assumption that the recommendation center infrastructure 508 generates both the original recommendations, and then, based on the original recommendations, the spaced recommendations. However, in another case, a first entity can generates the original recommendations and supply them to a second entity, which then varies these recommendations. Hence, the system 500 may comprise two or more recommendation center actors, not shown, potentially controlled by two or more different commercial entities.)

In terms of physical implementation, the recommendation center infrastructure 508 can be implemented as one or more server computers (e.g., as a "farm" of such computer servers) and associated databases. In conventional manner, the architecture of the recommendation center infrastructure 508 can be separated into front-end components which interface directly with the devices (502, 504, . . . 506) and back-end components which can perform offline analysis (such as accounting-related tasks, similarity table generating-tasks, and so forth). Generally, the components of the recommendation center infrastructure 508 can be located at a single site, or distributed over plural sites.

Figure 7:
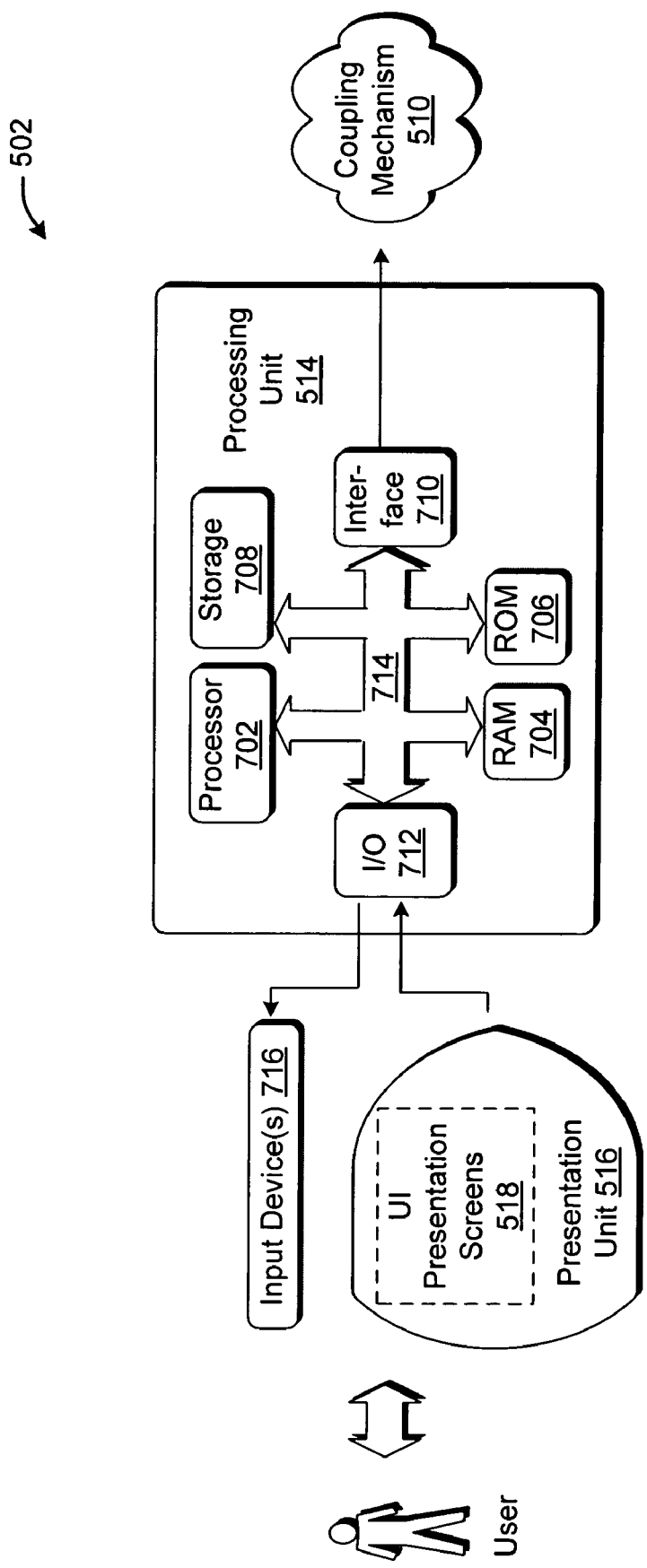
FIG. 7 shows an exemplary architecture of a user device that can interact with the system of FIG. 5.

The devices (502, 504, . . . 506) can represent any kind of electronic unit which can interact with the recommendation center infrastructure 508 via the coupling mechanism 508. In the most common case, the devices (502, 504, . . . 506) correspond to some kind of conventional computer device, such as a personal computer workstation, a laptop computer, and so forth. But any of the devices (502, 504, . . . 506) can also correspond to any kind of wearable computer, a mobile telephone, a Personal Digital Assistant (PDA) device, a stylus-type input device, a game console device, and so forth. In any event, a device, such as exemplary device 502, can comprise a processing unit 514 and a presentation unit 516. The processing unit 514 generally comprises functionality for processing information. FIG. 7, to be discussed in turn below, provides more exemplary details regarding an exemplary architecture of the processing unit 514. The presentation unit 516 generally corresponds to functionality for presenting the processed information and thereby allows the user to interact with the device 502. In the case where the device 502 outputs recommendations in visual form, the presentation unit 516 can provide a graphical user interface 518 for interacting with the user. The processing unit 514 can be separate from (but communicatively coupled to) the presentation unit 516; alternatively, the processing unit 514 can be integrated with the presentation unit 516.

Finally, the coupling mechanism 510 can correspond to any kind of communication conduit or combination of communication conduits. In the case most commonly evoked in this disclosure, the coupling mechanism 510 corresponds to a wide area network, such as the Internet. However, the coupling mechanism 510 can alternatively, or in addition, comprise other kinds of communication conduits, such as an intranet, point-to-point coupling arrangement, and so forth. In any case, the coupling mechanism 510 can include any combination of hardwired links, wireless links, routers, repeaters, gateways, name servers, and so forth (now shown), governed by an protocol or combination of protocols (e.g., TCP, IP, HTML, and so forth).

B.2. Exemplary Recommendation-Generating Module

Figure 6:
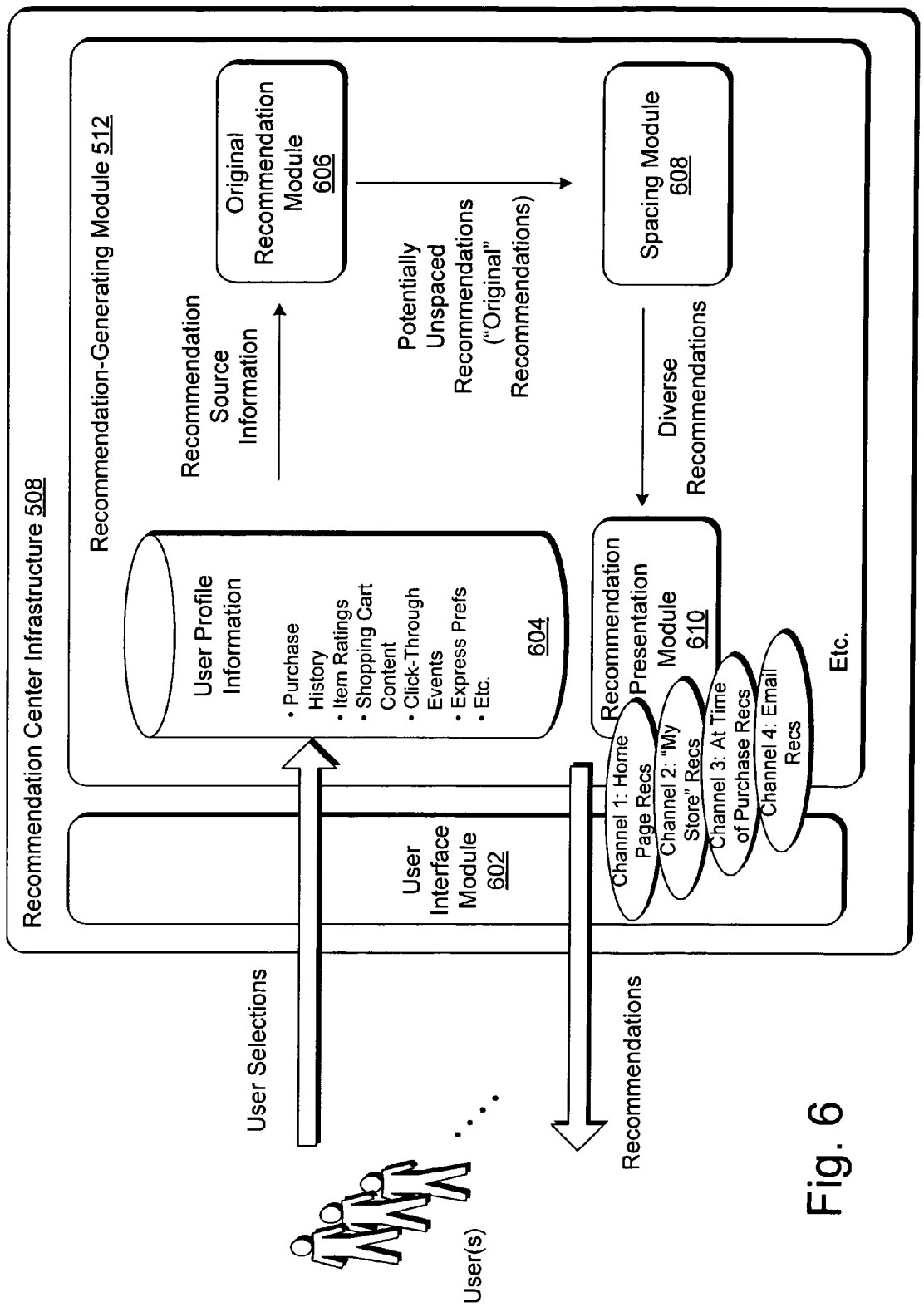
FIG. 6 shows an exemplary architecture of recommendation center infrastructure for use in the system of FIG. 5.

FIG. 6 shows exemplary features of the recommendation center infrastructure 508. It will be appreciated that the recommendation center infrastructure 508 performs many functions, only a subset of which are relevant to the generation of spaced recommendations. Hence, FIG. 6 shows only those components of the recommendation center infrastructure 508 which are pertinent to the focus of this disclosure. The term "module" as used herein refers either to software, hardware, or a combination of software and hardware for performing the prescribed functions to be described below. The features shown in FIG. 6 can be located at a single site, or distributed over plural sites.

The recommendation center infrastructure 508 includes a user interface module 602 coupled to the recommendation-generating module 512. More specifically, the interface module 602 can comprise one or more front-end components used to interact with the devices (502, 504, . . . 506). In operation, the interface module 602 receives selections from the users, which may comprise registration-related selections, browse-related selections, purchase-related selections, and so forth. The interface module 602 also generates output to the users. The output comprises any graphical and/or audio content provided by the Web merchandiser's online application, including a variety of pages related to different topics. A subset of the output comprises recommendations generated by the recommendation-generating module 512 in different "channels," to be described below in more detail.

The exemplary components of the recommendation-generating module 512 include one or more data stores for storing user profile information 604. The user profile information 604 records a variety of information relating to the users, providing a profile for each user. For each user, the profile information 604 can contain information regarding the purchases made by the user, the item rating entered by the user, the shopping cart selections made by the user, the click-through events made by the user, the preference-related information manually input by the user (e.g., indicating whether the user likes or dislikes certain items or certain characteristics of items), previous recommendations, and so forth—basically any of the information enumerated above as source information 302.

A recommendation-generating module 512 also includes an original recommendation module 606. (Alternatively, another entity, such as another recommendation center, can implement this module 606.) The purpose of this module 606 is to implement the so-called first pass recommendation algorithm introduced in the context of Section A, to generate the set of original recommendations. These original recommendations constitute recommendations that have not yet been modified to ensure that they are satisfactorily spaced. In making the original recommendations, the original recommendation module 606 can draw from various source information, including any information provided by the user profile information 604. In performing its analysis, the original recommendation module 606 can rely on any of the first pass processing algorithms described above in Section A, including empirical-based approaches (based on correlations in user purchase histories), browse tree-based approaches, attribute-related approaches, textual/syntactical-based approaches, and so forth. The output of the original recommendation module 606 is a potentially unspaced set of recommendations, represented by the original recommendations $R_1$-$R_{16}$ described in the context of FIGS. 3 and 4.

The spacing module 608 implements the spacing algorithms described in the context of FIGS. 3 and 4, or some other kind of spacing algorithm. Generally, the spacing modules 608 serves to select a subset of recommendations from the original recommendations to better ensure spacing in the output results forwarded to the users. (Alternatively, or in addition, the spacing module 608 can achieve spacing by adding new recommendations and/or reordering the original recommendations, and so on). In the case of algorithm A, the spacing module 608 ensures spacing by applying a repulsion force between pairwise combinations of similar original recommendations to diversify the recommendations. This approach has the effect of partitioning the original recommendation space into clusters. The spacing module 608 can then select representative members from the thus-formed clusters for output to the users. In the case of algorithm B, the spacing module 608 ensures spacing by applying novelty-based considerations, that is, by applying a repulsion force between recommendations and known information that reflects a user's presumed known interests. This approach has the effect of removing obvious recommendations from the set of original recommendations, leaving potentially non-obvious items (e.g., novel items) for output to the users.

In any event, the spacing module 608 can be designed so that it can accept and process any kind of recommendations generated by any kind of original recommendation module 606. In this sense, the spacing module 608 can be considered algorithm-agnostic with respect to the techniques used to generate the original recommendations.

A recommendation presentation module 610 formats the recommendations into different "channels" and disseminates the recommendations to the users via those channels. The recommendation-generating module 512 applies different channels depending on the context of a user's interaction with the recommendation center infrastructure 508, and/or based on other considerations. In one case, the recommendation-generating module 512 generates a series of recommendations for the user when the user initially accesses a homepage (also referred to a as a gateway) maintained by the recommendation center infrastructure 508. In another case, the recommendation-generating module 512 generates a series of recommendations for the user when the user visits a special "Store" service which provides tailored recommendations for the user. In another case, the recommendation-generating module 512 generates a series of recommendations when the user visits their shopping cart, and still another series of recommendations when the user makes a purchase. In another case, the recommendation-generating module 512 sends a targeted Email to the user that contains one or more recommendations. Still other channels for making recommendations are possible, the above listing of channels being a nonexhaustive one. For example, the recommendation-generating module 512 can even send recommendations to the user in hard copy form, e.g., by using targeted mailings, or through the generation of the printed coupons or other material at the point of purchase. The recommendation-generating module 512 can potentially apply different kinds of recommendation analyses depending on the channel that is being invoked, such that, for example, the recommendations generated when the user makes a purchase are different than the recommendations that the user sees when they visit their Store or when they receive a targeted Email.

B.3. Exemplary Client Device

FIG. 7 shows an exemplary architecture of representative user device 502 (introduced in the context of FIG. 5). The device 502 can correspond to any kind of conventional computer device, but can also correspond to any other kind of unit having processing and presentation capabilities (e.g., a PDA device, mobile telephone, game console, and so forth).

The processing unit 514 of device 506 can comprise one or more processing components 702 (such as CPU, neural network, etc.), RAM 704, RAM 706, media components 708 (such as a hard drive, DVD drive, etc.), network interface 710 (such as a telephone or cable modem, broadband connectivity mechanism, etc.), and an I/O interface 712 for interacting with input devices and output devices. One or more buses 714 couple the above-described components together. The output devices can include the presentation unit 516, which presents the graphical user interface 518. The input devices 716 can include any one or more of a keyboard, mouse input device, track ball input device, joystick input device, and so forth.

In one implementation, the recommendation center infrastructure 508 stores all of the logic functionality necessary to implement the Web application provided by the Web merchandiser. But in another implementation, the client device 502 can implement one or more aspects of the recommendation generating functionality 512.

B.4. Exemplary User Interface Presentation

Figure 2:
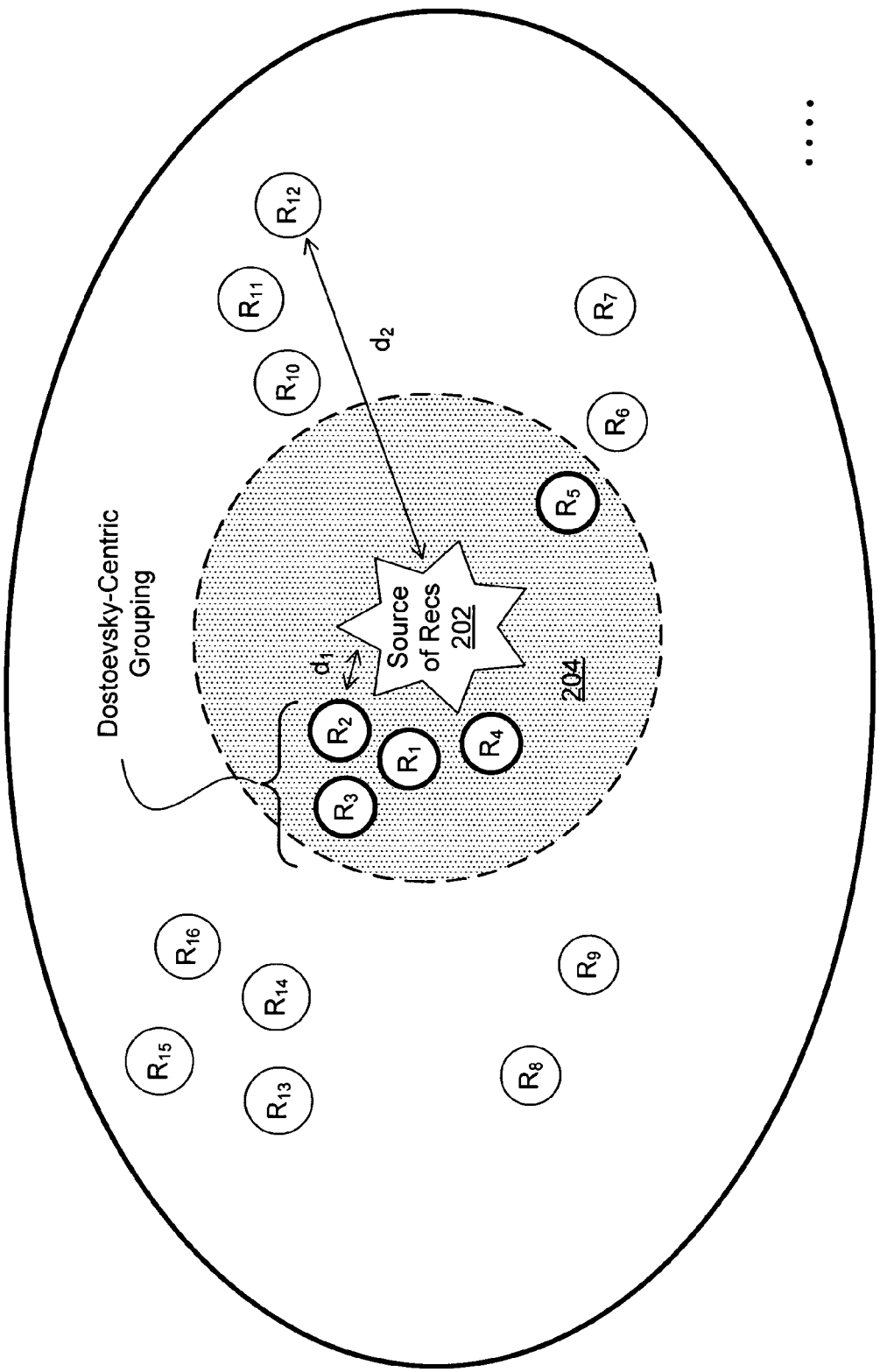
FIG. 2 shows a high-level conceptualization of a known algorithm for generating the recommendations having poor spacing shown in FIG. 1.

FIG. 8 complements FIG. 1 by showing how the problem shown in FIG. 1 is rectified by the application of the spacing algorithms described herein. The recommendation channel shown in FIG. 8 corresponds to the Store of the user John Smith. The Store represents a relatively large list of recommendations generated for John Smith based on his prior purchases, other online behavior, and other potential considerations. However, the concepts set forth with respect to FIG. 8 apply equally well to any recommendation channel.

Recall from the discussion of FIG. 1 that the user is interested in the author Dostoevsky, but is likely to be displeased by a set of recommendations that present nothing by novels written by Dostoevsky. Any avid reader of Dostoevsky already knows Dostoevsky's major works, and thus, any recommendations pertaining to these works will likely be regarding as useless screen clutter.

The set of spaced recommendations (802, 804, 806, 808) provide a more spaced selection of items. Recommendations 802 and 806 features Russian authors writing about the same time as Dostoevsky. Recommendation 804 features a book that addresses the subject of Art and Epilepsy, having some bearing on Dostoevsky, who suffered from this ailment. Recommendation 808 features a book that provides travel information regarding trips to St. Petersburg, having some bearing on Dostoevsky, as that is the locus of many of his stories. Of course, this small sampling of recommendations is merely illustrative.

Assume first that the recommendations (802, 804, 806, 808) represent the results of the output of algorithm A described in connection with FIG. 3. In this case, the recommendations (802, 804, 806, 808) might represent representative members of the clusters (304, 306, 308, 310) shown in FIG. 3. Assume next that the recommendations (802, 804, 806, 808) are the result of the output of the algorithm B described in the context of FIG. 4. In this case, the recommendations (802, 804, 806, 808) might represent recommendations selected from the non-obvious recommendation space 408 that orbits the obvious clusters 404 and 406. In either scenario, note that the recommendations (802, 804, 806, 808) do not inundate the users with the univocal theme of books written by Dostoevsky.

C. Exemplary Method of Operation (FIGS. 9-12)

The remaining figures (FIGS. 9-12) describe the operation of the recommendation-generating module 512 in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure. The steps shown in the flowcharts can be implemented by software, hardware, a combination of software and hardware, or by other technology.

C.1. Overview

Figure 9:
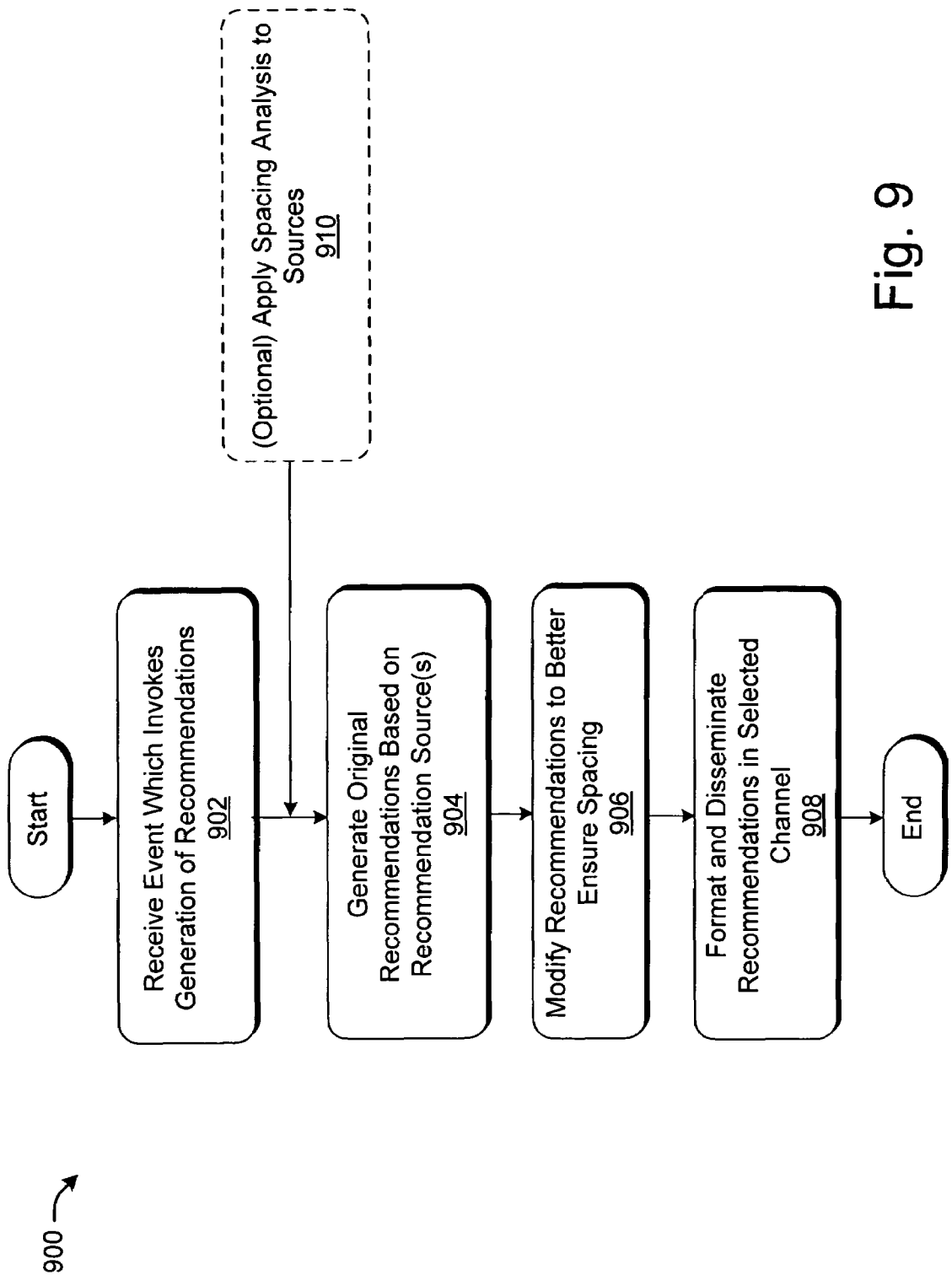

FIG. 9 shows a general procedure 900 for generating recommendations, corresponding to either of the two spacing algorithms discussed above, or some other spacing algorithm.

In step 902, the recommendation-generating module 512 receives an event which invokes the generation of recommendations. Such an event may correspond to: the user first accessing a website associated with the recommendation center infrastructure 508; the user accessing their Store which provides customized recommendations; the user adding an item to their shopping cart or otherwise visiting their shopping cart; the user making a purchase, and so forth. Or the event can correspond to a triggering event (which may be independent of the actions of the user) which prompts the recommendation-generating module 512 to send an Email to the user which provides recommendations. Still other kinds of triggering events are possible.

In step 904, the recommendation-generating module 512 (or some other third party module) generates a set of recommendations based on any of first pass algorithms described above. Exemplary techniques include empirical-based techniques (based on patterns in purchase histories), browse tree-type techniques, attribute-based techniques, textual-syntactical-based techniques, and so forth. In the context of FIGS. 3 and 4, the ouptut of step 904 is the set of original recommendations $R_1$-$R_{16}$. Of course, this step (904) can produce any number of original recommendations.

In step 906, the recommendation-generating module 512 modifies the original recommendations to better ensure spacing in the recommendations. To perform this task, the recommendation-generating module 512 can apply algorithm A (FIG. 3), algorithm B (FIG. 4), or some other kind of algorithm or combination of algorithms. The output of this step is the set of spaced recommendations.

In step 908, the recommendation-generating module 512 can format and forward the set of spaced recommendations to the users. The recommendation-generating module 512 can generate these outputs via one or more recommendation channels described above (in the context of FIG. 6).

A final step 910 indicates that spacing analysis can optional be performed on the root source material itself. That is, the recommendation-generating module 512 generates recommendations based on source information (such as source information 302 of FIGS. 3 or source information 402 of FIG. 4). In this optional scenario, spacing analysis is applied directly to this source information to select a more spaced subset of source information items. The recommendation-generating module 512 then generates original recommendations based on this spacing-modified set of source information items, after which it can optionally again apply spacing analysis to improve the spacing of the original recommendations generated by the spacing algorithm. Accordingly, in this example, the procedure 900 can apply spacing analysis twice, a first time in step 910 and a second time in step 906. Take, for example, the simplified case in which original recommendations are based on a set of items purchased by the user in a prior year. This set of items constitutes the source information in this scenario. Step 904 acts to prune the source information so that it is better spaced, to provide the spacing-modified set of source information.

C.2. Spacing Algorithm A (Mutual Separation, e.g., Diversity)

FIG. 10 shows a procedure 1000 which represents one specific implementation of the spacing algorithm A shown in FIG. 3. Recall that this algorithm metaphorically applies a repulsive force between pairs of recommendations to ensure that no two recommendations are too close together. The end result of this procedure 1000 is a potentially more diverse set of recommendations compared to the original recommendations because the remaining recommendations are, figuratively speaking, spread apart.

In step 1002, the recommendation-generating module 512 forms clusters based on the set of original recommendations. The clusters are defined by groupings of recommendations that are closely related to each other. Relatedness between recommendations can be assessed in any number of ways enumerated in Section A.

In step 1004, the recommendation-generating module 512 selects one or more representative members from each of the clusters. Different criteria can be used to select representative members. In one case, the recommendation-generating module 512 can randomly select a representative member from each cluster. In another case, the recommendation-generating module 512 can select the member of each cluster which has the highest rank, e.g., the members which is most closely related to the source information. Still other techniques exist for selecting representative members from the clusters.

The right portion of FIG. 10 provides yet further details regarding one exemplary and non-limiting technique for clustering the set of original recommendations.

In step 1006, the recommendation-generating module 512 ranks the items in the set of original recommendations. For example, the recommendation-generating module 512 can rank the recommendations from most relevant to least relevant (with respect to the source information 302), or based on other considerations.

In step 1008, the recommendation-generating module 512 applies analysis to the recommendations in the set of original recommendations, processing each recommendation in turn. With respect to a particular recommendation under consideration ("a candidate item"), the recommendation-generating module 512 computes a spacing group based on the candidate item. The spacing group comprises a group of members which are considered similar to the candidate item. Any technique can be used to assess relatedness, such as any of the techniques described in Section A (such as empirical techniques based on purchase history, graphing techniques based on distances between nodes, and so forth). An item can be considered to be a member of the spacing group of its relatedness to the candidate item satisfies a prescribed threshold. For example, consider the illustrative case of FIG. 3. The recommendation generating engine 512 can generate a spacing group for recommendation $R_1$ (the highest ranked recommendation) by identifying a group of members ($D_1$, $D_2$, $D_3$, etc.) (not shown) that are similar to this recommendation $R_1$. In other words, recommendation $R_1$ serves as the "anchor point" to generate these spacing group members ($D_1$, $D_2$, $D_3$, etc.).

Second, the recommendation-generating module 512 determines whether the thus-computed spacing group includes members that also appear in the set of original recommendations $R_1$-$R_{16}$, and which also have a lower rank than the recommendation under consideration (i.e., the candidate item). For example, again consider the case where a spacing group has been generated for recommendation $R_1$ in FIG. 3. Assume that this spacing group ($D_1$, $D_2$, $D_3$, etc.) Includes one or more members that also appear in the set of original recommendations, such as $R_2$, $R_3$, and $R_4$ (e.g., $D_1$=$R_2$, $D_2$=$R_3$ and $D_3$=$R_4$), and further assume that these items ($R_2$, $R_3$, and $R_4$) have a lower rank compared to recommendation $R_1$.

Third, the recommendation-generating module 512 eliminates any recommendations of lower rank that were identified in the second step. In the example developed above, this will have the effect of eliminating the recommendations $R_2$, $R_3$, and $R_4$ from the set of original recommendations. This means that the above-described analysis will not be performed for these lower ranking recommendations ($R_2$, $R_3$, $R_4$). But, in one implementation, in step 1004, the recommendation-generating module 512 can select a representative member of the cluster 304 from the spacing group. Thus, the recommendation-generating module 512 might select, for example, recommendation $R_4$ as the representative member of the cluster 304, even though it is being eliminated from the set of original recommendations.

The above procedure (1008) is repeated for each recommendation in the set of original recommendations. In essence, the algorithm shown in FIG. 11 has the effect of diluting the clusters (304, 306, 308, 310, 312) by removing members from these clusters. For example, consider the case where recommendation $R_1$ corresponds to a book by Dostoevsky, and is the most relevant recommendation in the set of original recommendations. Generating a spacing group for recommendation $R_1$ will independently generate recommendations which are closely related to recommendation $R_1$, which may logically include other books written by Dostoevsky. If the spacing group happens to include recommendations $R_2$, $R_3$ and $R_4$, then step 1008 removes these recommendations from consideration in the manner described above.

Those skilled in the art will appreciate that there are many other ways to perform clustering analysis besides the procedure 1000 illustrated in FIG. 10. For example, clustering can be performed by constructing a graph, where recommendations represent nodes in the graph, and then partitioning this graph using known methods.

Another kind of clustering algorithm is to limit the number of recommendation in certain subjects to a prescribed number. For example, assume that the Web application can generate recommendations pertaining to books, music, and clothing. A spacing algorithm can ensure that no category receives more than a prescribed number of recommendations, such as 3 or 5, etc. This is referred to as a bucketized approach to spacing, because recommendations are placed in different "buckets" and the number of recommendations that can be placed in each bucket is constrained by configurable settings.

The above algorithm ensures that recommendations are far enough apart by actually excluding some of the recommendations from the original set of recommendations. But it is also possible to provide this separation by reordering the original set of recommendations so that similar recommendations are not placed close together (in the sequence of their presentation), and/or by potentially adding new recommendations to the set of original recommendations. These operations may ensure that a list of recommendations will not have several closely related recommendations in succession.

Section D (below) identifies other techniques that can be used to perform cluster analysis to generate a diverse set of recommendations.

C.3. Spacing Algorithm B (Novelty)

FIG. 11 shows a procedure 1100 which represents one specific implementation of the algorithm B shown in FIG. 4. Recall that this algorithm applies novelty-type analysis to the set of original recommendation to ensure that obvious recommendations are excluded or diluted in the set of recommendations output to the user.

In step 1102, the recommendation-generating module 512 determines obvious recommendation items.

In step 1104, the recommendation-generating module 512 removes the obvious recommendations from the set of original recommendations to provide the set of spaced recommendations.

The right portion of FIG. 11 provides yet further details regarding one technique for identifying obvious recommendations. In step 1106, the recommendation-generating module 512 assesses known information, which identifies one or more items that the user is presumed to know about already. The recommendation-generating module 512 can ascertain such known information in any number of ways, such as by examining the purchase behavior of the user, the shopping cart selections of the user, the click-through behavior of the user, the generation of previous recommendations, and so forth—basically, any technique used to collect the source information 302, as enumerated above. These events may indicate that the user is aware of the items associated with the events. To take one illustrative example, if the user has previously ranked a music album, the user is presumed to have knowledge of this album. Moreover, in one implementation, an assessment of the items that the user knows about takes into account the currency of the known information. For example, the known information can be expired after a specified period of time, such that the known information at any given time is based on generally up-to-date indicators of the user's interests.

Alternatively, the user may be permitted to expressly indicate items that they are aware of. For example, the user can indicate that he is well aware of the author Dostoevsky, even though he might have never purchased a book by Dostoevsky. In this sense, Dostoevsky can be considered as an "anti-favorite" of the user. The user may select Dostoevsky as an anti-favorite because he dislikes this author, or because he very much likes this author but does not believe that he will benefit from Dostoevsky-centric recommendations.

In step 1108, the recommendation-generating module 512 computes spacing groups for each of the respective items determined to be known in step 1106. The recommendation-generating module 512 can compute spacing groups in the same manner described with respect to FIG. 10, such as by using empirically-based similarity scoring based on user profiles, or by using any other kind of cluster analysis.

In step 1110, the recommendation generating engine 512 determines whether any members in the spacing groups are also present in the set of original recommendations. If so, these recommendations comprise obvious recommendations which are removed in step 1104.

Consider the scenario shown in FIG. 4 to illustrate the operation of the procedure 1100. Assume again that it is apparent from at least the user's purchase history that this user is familiar with the author Dostoevsky. Assume, for example, the user has purchased two books by Dostoevsky in the last three months. This purchase history therefore defines, at least in part, the known information associated with this user. The procedure 1100 shown in FIG. 11 then generates a spacing group based on the purchase of these two books. The spacing group logically includes other books written by Dostoevsky, which may correspond to recommendations $R_1$, $R_2$, $R_3$ and/or $R_4$. If so, then the procedure 1100 effectively removes these recommendations from the final set of recommendations that are output to the user. Assume further that the user also bought one book regarding cooking, which causes the first pass algorithm to generate recommendations $R_5$, $R_6$, and $R_7$ of FIG. 4. If it is determined that any of these recommendations ($R_5$, $R_6$, and $R_7$) is contained within a cooking-related obvious spacing group, then procedure 110 will also remove recommendations $R_5$, $R_6$, and $R_7$.

In many cases, the effect of the operation of procedure 1100 is to exclude the most relevant (core) items in the original recommendations $R_1$-$R_{16}$. But this need not always be so. Generally, this procedure 1100 removes recommendations considered to be obvious. If a few of the items that the user knows about happen to be rather obscure items (e.g., not reflecting the main tenor of the user's interest), then the effect of procedure 1100 is to also remove one or more recommendations that are not so closely clustered around the source information 402. For instance, in the exemplary scenario of FIG. 6, recommendations $R_6$ and $R_7$ are not extremely closely related to the main interests of the user (as represented by the source information 402), but are nevertheless excluded because it is assessed that these items would nevertheless be obvious to the user.

The procedure 1100 shown in FIG. 11 can be considered to improve spacing in the sense that it reduces a potentially heavy concentration of obvious items in the original recommendations. The removed obvious recommendations can be considered as implicitly before the user's consideration, because the user is presumed to know about them to begin with. In another implementation, instead of entirely eliminating obvious recommendations, the algorithm can be modified to select one or more representative items of the obvious recommendations for presentation to the user (e.g., in the manner of the procedure 1000 shown in FIG. 10). This has the effect of diluting the obvious items, not outright excluding them.

Those skilled in the art will appreciate that there are many other ways to perform novelty-type analysis besides the procedure 1100 illustrated in FIG. 11. For example, another novelty-based algorithm can allow the user to manually specify recommendations that they do not wish to receive. For example, the user may expressly specify that he does not wish to see any recommendations in which "author=Dostoevsky." This comprises a manual and explicit way that a user can populate the collection of known information. Further, insofar as the novelty analysis, like the previously described diversity analysis, also forms clusters (e.g., to define obvious groupings of recommendations), any kind of cluster analysis can be applied to form novel recommendations. Section D (below) identifies various techniques that can be used to perform cluster analysis to generate novel set of recommendations.

Generally, the algorithm described in this subsection ensures that recommendations are sufficiently separated from the known information by actually excluding some of the recommendations from the original set of recommendations. But it is also possible to provide this separation by reordering the original set of recommendations so that similar recommendations are not placed close together (in the sequence of their presentation), and/or by potentially adding new recommendations to the set of original recommendations, and so on.

C.4. Other Applications

The examples set forth above pertain to the generation of recommendations which attempt to entice the user to purchase items (e.g., goods and/or services). However, the spacing algorithms can be applied in other environments. The final figure, FIG. 12, shows a procedure for applying a spacing algorithm to the output of search results. As defined above, the term "recommendation" is intended to have broad connotation herein, such that a search result can be considered as a recommendation.

In step 1302 a search engine receives a search query entered by the user, comprising any kind of Boolean search string, free-form text string, or other kind of query.

In step 1204, the search engine generates a set of original search results based on matching the search query to records in a database. The search engine might optionally apply other retrieval strategies, such as artificial analysis tools, etc.

In step 1206, the search engine can modify the set of original search results using any one of the spacing algorithms, or any other kind of spacing algorithm. Spacing algorithm A has the effect of providing a diverse sampling of items in the set of original search results. Spacing algorithm B has the effect of excluding obvious search results from the set of original search results. Obviousness can be gauged in different ways in this context. The spacing algorithm B can, for example, eliminate search results that are related to search results already known to be reviewed by the user, or based on some assessment that the user is familiar with a certain topic or journal source, and so forth.

In step 1208, the search engine supplies the set of spaced search results to the user for their review.

Still other alternative applications are possible, such as the use of a spacing algorithm to generate paper coupons to users at the point of purchase based on a consideration of the user's present (and/or previous) purchases.

D. Other Exemplary Approaches to Clustering

As described above, the algorithms described herein ensure novelty and diversity using so-called repulsion force analysis. One way to implement such repulsion force analysis is by using a clustering approach. More specifically, to summarize, the above-described diversity and novelty algorithms form a cluster around a reference (such as a "best" recommendation) by computing the distance from the reference to other recommendations. The algorithms then define membership in the cluster by determining those recommendations which are within a predetermined threshold distance from the reference. In other words, this approach defines the cluster as including recommendations which are sufficiently similar to the reference.

However, many other clustering approaches can be used to define clusters for use in both the diversity and novelty algorithms described above, including various types of partitioning approaches, hierarchical approaches, density-based approaches, categorical approaches, grid-based approaches, artificial intelligence approaches, and so forth. By way of overview, some of these approaches may use an explicit distance metric in their computations, while others may not. And in those techniques that use an explicit distance metric, a wide variety of different distance metrics can be used to assess similarity among recommendations (and between recommendations and other reference items). Overviews of clustering analysis can be found in a number of sources, such as J. A. Hartigan, *Clustering Algorithms,* John Wiley & Sons, Inc., New York, 1975, B. S. Everitt, *Cluster Analysis*, Arnold publishers, London, fourth edition, 2001, A. Hinneburg et al., *Clustering Techniques for Large Data Sets: From Past to Future*, PKDD, 2000, and so forth.

An exemplary and non-exhaustive list of possible approaches that can be used to compute clusters for diversity and novelty purposes follows:

Breadth-first search analysis. Note, for example, E. F. Moore, "The Shortest Path Through a Maze," Proceedings of International Symposium on Theory of Switching, Part II, Cambridge, Mass., Harvard University Press, 1959, pp. 285-292.

Strongly connected component analysis. Note, for example, R. Tarjan, "Depth First Search and Linear Graph Algorithms," SIAM Journal of Computing, June 1972, pp. 146-160.

K-means clustering analysis. Note, for example, J. B. MacQueen, "Some Methods for Classification and Analysis of Multivariate Observations," Proceedings of the $5^{th}$ Berkeley Symposium on Mathematical Statistics and Probability, Berkeley, University of California Press, 1967, Vol. 1, pp. 281-297. K-means clustering defines a kind of unsupervised learning algorithm that will classify the recommendations into a predetermined number of clusters.

Fuzzy C-means clustering analysis. Note, for example, J. C. Dunn, "A Fuzzy Relative of the ISODATA Process and Its Use in Detecting Compact Well-Separated Clusters," Journal of Cybernetics, Vol. 3, 1973, pp. 32-57.

Hierarchical clustering analysis. Note, for example, S. Johnson, "Hierarchical Clustering Schemes," Psychometrika, Vol. 2, 1967, pp. 241-254, Hierarchical techniques can include so-called bottom-up (agglomerative) approaches and top-down (divisive) approaches.

Grid-based analysis. Note, for example, A. Kiem, "Optimal Grid-Clustering: Towards Breaking the Curse of Dimensionality in High-Dimensional Clustering," in Proceedings of the $25^{th}$ International Conference on Very Large Data Bases, Edinburgh, 1999, pp. 506-517.

Density-based analysis. Note, for example, B. Silverman, Density Estimation for Statistics and Data Analysis, Chapman and Hall, 1986.

Self organizing maps (SOM) analysis. Note, for example, R. Rojas, Neural Networks—A Systematic Introduction, Springer Berlin, 1996.

Neural gas analysis. Note, for example, T. M. Martinetz et al., "Neural-gas Network for Vector Quantization and its Application to Time-series Prediction," IEEE Trans. Neural Networks, Vol. 4, 1993, pp. 558-569.

Growing Network analysis. Note, for example, B. Fritzke, "A Growing Neural Gas Network Learns Topologies," Advances in Neural Information Processing Systems, MIT Press, Cambridge, Mass., Vol. 7, 1995.

Categorical clustering analysis. Note, for example, D. Gibson et al., "Clustering Categorical Data: An Approach Based on Dynamical Systems," in Proceedings of the 24th International Conference on Very Large Data Bases, BLDB, 1998, pp. 311-322.

Still other approaches can be used.

Moreover, other kinds of analysis, besides cluster analysis, can be used to implement the above-described repulsion force analysis. As broadly characterized herein, the recommendations can be conceptualized as a "swarm" of opposing items, either pushing against each other, pushing against known items, or both pushing against each other and known items. The strength of the repulsive force between any two items is related to the degree of similarity between the two items, with very similar items exhibiting a relatively large amount of repulsive force. At the same time, to continue the metaphor of force, the recommendations remain bound by the "gravitational pull" of the source items used to generate the original set of recommendations. In such a system of forces, a configuration energy collectively defines the forces exhibited by the original recommendations. The goal of the repulsion force analysis is to achieve a combination of recommendations which minimizes—or at least reduces—the configuration energy exhibited by other system. The repulsion force analysis can achieve this effect through any combination of modifications to the original set of recommendations, such as by eliminating one or more recommendations, changing the order in which the recommendation are presented to the user, adding new recommendations to the original set of recommendations, and so forth.

Different mathematical modeling tools, which do not necessarily fall under the rubric of cluster analysis, can be used to achieve global minimization of configuration energy (or at least global reduction of configuration energy). Where there is relatively manageable number of possible permutations, global minimization can be performed by computing the energy of each permutation, and selecting the permutation with the least amount of energy. Here, "energy" may represent an aggregation of similarity scores in the system, where each item is compared to every other item. More complex approaches can use approximation techniques, such as Monte Carlo analysis, and so forth.

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for generating novel recommendations, the method implemented at least in part by a computing device and comprising:
   providing at least one source of information from which to generate recommendations;
   generating a set of original recommendations based at least in part on said at least one source of information;
   generating a set of novel recommendations from the set of original recommendations based at least in part on repulsion force analysis applied to the set of original recommendations, wherein the repulsion force analysis ensures that at least one recommendation is separated from a reference by at least a sufficient amount to provide a desired degree of variation between said at least one recommendation and the reference; and
   providing the set of novel recommendations to a user;
   wherein the reference is known information that identifies at least one known interest of the user, such that the repulsion force analysis ensures that said at least one recommendation is separated from the known information by the sufficient amount.

2. The method of claim 1, wherein said at least one source of information comprises information regarding the past behavior of one or more users.

3. The method of claim 1, wherein the generating of the set of original recommendations comprises generating original recommendations which exhibit, based at least in part on attraction force analysis, at least a sufficient degree of relatedness to said at least one source of information.

4. The method of claim 1, wherein the separation of said at least one recommendation from the reference is based at least in part on a distance metric that defines the similarity between said at least one recommendation and the reference.

5. The method of claim 4, wherein the distance metric is a measure of relatedness within a subject matter hierarchy.

6. The method of claim 1, wherein the known information pertains to the user's behavior with respect to one or more items.

7. The method of claim 6, wherein the known information comprises one or more of:
   information pertaining to the user's selection of an item;
   information pertaining to the user's purchase of the item;
   information pertaining to the user' ranking of the item; or
   information pertaining to express preference-related information entered by the user with respect to the item.

8. The method of claim 1, wherein the generating of the set of novel recommendations comprises:
   identifying obvious original recommendations in the set of original recommendations; and
   reducing the concentration of the obvious original recommendations in the set of original recommendations, to yield the set the novel recommendations.

9. The method of claim 8, wherein the identifying of the obvious original recommendations comprises:
   determining known items concerning which the user is presumed to have prior knowledge;
   for each known item under consideration:
      comprising a spacing group containing members that are determined to be related to the known item under consideration;
      determining whether any members in the spacing group match any original recommendations in the set of original recommendations, to yield the obvious original recommendations.

10. The method of claim 1, further comprising applying spacing analysis to said at least one source of information to generate modified source information, and wherein the generating of the recommendations is applied to the modified source information.

11. The method of claim 1, wherein the novel set of recommendations comprises a subset of the set of the original recommendations.

12. The method of claim 1, wherein the novel set of recommendations comprises a set of recommendations including at least one recommendation that is not present in the set of original recommendations.

13. The method of claim 1, wherein the novel set of recommendations comprises a reordering of items in the set of original recommendations.

14. The method of claim 1, wherein the set of novel recommendations pertain to items that can be acquired by the user.

15. The method of claim 1, wherein the set of novel recommendations pertain to search results generated in response to a search query made by the user.

16. The method of claim 1, wherein the generating of the set of original recommendations and the generating of the set of novel recommendations comprise two operations performed in temporal succession.

17. The method of claim 1, wherein the generating of the set of original recommendations and the generating of the set of novel recommendations comprise a single integrated operation.

18. One or more machine-readable media containing machine readable instructions for implementing the method of claim 1.

19. A system comprising:
one or more processors;
memory; and
a recommendation-generating module, stored in the memory and executable on the one or more processors, the recommendation-generating module comprising:
logic configured to generate a set of original recommendations based at least in part on at least one source of information;
logic configured to generate a set of novel recommendations from the set of original recommendations based at least in part on repulsion force analysis applied to the set of original recommendations, wherein the repulsion force analysis ensures that at least one recommendation is separated from a reference by at least a sufficient amount to provide a desired degree of variation between said at least one recommendation and the reference; and
logic configured to provide the set of novel recommendations to a user,
wherein the reference is known information that identifies at least one known interest of the user, such that the repulsion force analysis ensures that said at least one recommendation is separated from the known information by the sufficient amount.

20. One or more machine-readable media containing machine readable instructions for implementing the recommendation-generating module of claim 19.

21. A method for generating novel recommendations, the method implemented at least in part by a computing device and comprising:
receiving a set of original recommendations which have been generated based at least in part on at least one source of information;
generating a set of novel recommendations from the set of original recommendations based at least in part on repulsion force analysis applied to the set of original recommendations, wherein the repulsion force analysis ensures that at least one recommendation is separated from a reference by at least a sufficient amount to provide a desired degree of variation between said at least one recommendation and the reference; and
providing the set of novel recommendations to a user;
wherein the reference is known information that identifies at least one known interest of the user, such that the repulsion force analysis ensures that said at least one recommendation is separated from the known information by the sufficient amount.

22. One or more machine-readable media containing machine readable instructions for implementing the method of claim 21.

23. A method for generating novel recommendations, the method implemented at least in part by a computing device and comprising:
receiving a set of original recommendations which have been generated based at least in part on at least one source of information;
generating a set of novel recommendations which improve novelty in the set of original recommendations by:
determining known items concerning which the user is presumed to have prior knowledge;
expanding the known items to include a collection of items which are determined to be related to the known items, to provide an expanded set of items;
identifying whether any members of the expanded set of items are present in the set of original recommendations to define obvious original recommendations; and
reducing he concentration of the obvious original recommendations in the set of original recommendations, to yield the set the novel recommendations; and
providing the set of novel recommendations to a user.

24. One or more machine-readable media containing machine readable instructions for implementing the method of claim 23.

25. A method for generating novel recommendations, the method implemented at least in part by a computing device and comprising:
receiving a set of original recommendations which have been generated based at least in part on at least one source of information;
generating a set of novel recommendations from the set of original recommendations through the use of cluster analysis, wherein the generating ensures that at lest one recommendation is separated from a reference by at least a sufficient amount to provide a desired degree of variation between said at least one recommendation and the reference; and
providing the set of novel recommendations to a user,
wherein the reference is known information that identifies at least one known interest of the user, such that the cluster analysis ensures that said at least one recommendation is separated from the known information by the sufficient amount.

26. One or more machine-readable media containing machine readable instructions for implementing the method of claim 25.

27. A method comprising:
under control of one or more computer systems configured with executable instructions,
providing at least one source of information from which to generate recommendations;
generating a first set of recommendations based at least in part on said at least one source of information;
generating a second set of recommendations from the first set of recommendations based at least in part on repulsion force analysis applied to the first set of recommendations, wherein the repulsion force analysis ensures that at least one recommendation is separated from a reference by at least a sufficient amount to provide a desired degree of variation between said at least one recommendation and the reference; and
providing the second set of recommendations to a user, wherein the reference is known information that identifies at least one known interest of the user, such that the repulsion force analysis ensures that said at least one recommendation is separated from the known information by the sufficient amount.

28. The method of claim 27, wherein the second set of recommendations comprises a set of novel or unique recommendations.

29. The method of claim 27, wherein the generating of the second set of recommendations comprises:
   determining known items of which the user is presumed to have prior knowledge; and
   removing at least one determined known item from the first set of recommendations to at least partly define the second set of recommendations.

\* \* \* \* \*